US012770627B2

(12) United States Patent
Wang et al.

(10) Patent No.: US 12,770,627 B2
(45) Date of Patent: Oct. 20, 2026

(54) MULTI-CHANNEL AUDIO SIGNAL ENCODING METHOD AND APPARATUS

(71) Applicant: HUAWEI TECHNOLOGIES CO., LTD., Shenzhen (CN)

(72) Inventors: Zhi Wang, Beijing (CN); Jiance Ding, Beijing (CN); Bin Wang, Shenzhen (CN); Haiting Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 483 days.

(21) Appl. No.: 18/154,451

(22) Filed: Jan. 13, 2023

(65) Prior Publication Data

US 2023/0154472 A1 May 18, 2023

Related U.S. Application Data

(63) Continuation of application No. PCT/CN2021/106102, filed on Jul. 13, 2021.

(30) Foreign Application Priority Data

Jul. 17, 2020 (CN) ......................... 202010699775.8

(51) Int. Cl.
*G10L 19/008* (2013.01)
*G10L 19/002* (2013.01)
*G10L 25/21* (2013.01)

(52) U.S. Cl.
CPC .......... *G10L 19/008* (2013.01); *G10L 19/002* (2013.01); *G10L 25/21* (2013.01)

(58) Field of Classification Search
CPC ..... G10L 19/00; G10L 19/008; G10L 19/002; G10L 25/00; G10L 25/21
See application file for complete search history.

(56) References Cited

U.S. PATENT DOCUMENTS

2008/0027709 A1* 1/2008 Baumgarte ......... G10L 19/0208
704/E19.019
2008/0262850 A1* 10/2008 Taleb .................... G10L 19/008
704/500

(Continued)

FOREIGN PATENT DOCUMENTS

CN 109074810 A 12/2018
WO 2020007719 A1 1/2020

OTHER PUBLICATIONS

Schuh, F., Dick, S., Füg, R., Helmrich, C.R., Rettelbach, N. and Schwegler, T., Sep. 2016. Efficient multichannel audio transform coding with low delay and complexity. In Audio Engineering Society Convention 141. Audio Engineering Society. (Year: 2016).*

*Primary Examiner* — Sean E Serraguard
(74) *Attorney, Agent, or Firm* — WOMBLE BOND DICKINSON (US) LLP

(57) ABSTRACT

Disclosed are a multi-channel audio signal encoding method and apparatus. Audio signals of P channels in a current frame of a multi-channel audio signal can be obtained, where the audio signals of the P channels include audio signals of K channel pairs; respective bit quantities of the K channel pairs are determined based on the respective energy/amplitudes of the audio signals of the P channels and a quantity of available bits; and the audio signals of the P channels are encoded based on the respective bit quantities of the K channel pairs to obtain an encoded bitstream, to improve encoding quality.

20 Claims, 8 Drawing Sheets

(56) References Cited

U.S. PATENT DOCUMENTS

| | | | | |
|---|---|---|---|---|
| 2009/0276210 | A1 | 11/2009 | Goto et al. | |
| 2013/0030819 | A1* | 1/2013 | Purnhagen | G10L 19/008 704/500 |
| 2015/0025894 | A1 | 1/2015 | Lee et al. | |
| 2015/0131800 | A1 | 5/2015 | Mundt et al. | |
| 2018/0330740 | A1* | 11/2018 | Ravelli | G10L 19/008 |
| 2019/0259395 | A1* | 8/2019 | Buethe | G10L 19/008 |
| 2021/0104249 | A1* | 4/2021 | Fotopoulou | G06F 3/162 |

* cited by examiner

MULTI-CHANNEL AUDIO SIGNAL ENCODING METHOD AND APPARATUS

CROSS-REFERENCE TO RELATED APPLICATIONS

This application is a continuation of International Application No. PCT/CN2021/106102, filed on Jul. 13, 2021, which claims priority to Chinese Patent Application No. 202010699775.8, filed on Jul. 17, 2020. The disclosures of the aforementioned applications are hereby incorporated by reference in their entireties.

TECHNICAL FIELD

This application relates to audio encoding and decoding technologies, and in particular, to a multi-channel audio signal encoding method and apparatus.

BACKGROUND

With continuous development of multimedia technologies, audio has been widely used in the fields such as multimedia communication, consumer electronics, virtual reality, and human-computer interaction. Audio encoding is one of key technologies of the multimedia technologies. In audio encoding, redundant information in a raw audio signal is removed to reduce a data volume, so as to facilitate storage or transmission.

Multi-channel audio encoding is encoding of more than two channels, including common 5.1 channels, 7.1 channels, 7.1.4 channels, 22.2 channels, and the like. Multi-channel signal screening, coupling, stereo processing, multi-channel side information generation, quantization processing, entropy encoding processing, and bitstream multiplexing are performed on a multi-channel raw audio signal to form a serial bitstream (an encoded bitstream), so as to facilitate transmission in a channel or storage in a digital medium. Because an energy difference between a plurality of channels is relatively large, energy equalization may be performed on the plurality of channels before stereo processing, to increase a stereo processing gain, thereby improving encoding efficiency.

For energy equalization, a manner of averaging energy of all channels is usually used. This manner affects quality of an encoded audio signal. For example, when an energy difference between channels is relatively large, the foregoing energy equalization method causes insufficient encoding bits of a channel frame with larger energy/a larger amplitude and the channel frame is poor in quality, and encoding bits of a channel frame with smaller energy are redundant and resources are wasted. In a case of a low bit rate, total available bits are insufficient. As a result, quality of the channel frame with the larger energy/large amplitude decreases significantly.

SUMMARY

This application provides a multi-channel audio signal encoding method and apparatus, to help improve quality of an encoded audio signal.

According to a first aspect, an embodiment of this application provides a multi-channel audio signal encoding method. The method may include: obtaining audio signals of P channels in a current frame of a multi-channel audio signal, where P is a positive integer greater than 1, the audio signals of the P channels include audio signals of K channel pairs, and K is a positive integer; obtaining respective energy/amplitudes of the audio signals of the P channels; determining respective bit quantities of the K channel pairs based on the respective energy/amplitudes of the audio signals of the P channels and a quantity of available bits; and encoding the audio signals of the P channels based on the respective bit quantities of the K channel pairs to obtain an encoded bitstream.

Energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing.

In this embodiment, bits are allocated for the channel pairs based on at least one of: respective energy/amplitudes of the audio signals of the P channels in time domain, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing, to determine respective bit quantities of the K channel pairs. In this way, the bit quantities of the channel pairs in multi-channel signal encoding are properly allocated, to ensure quality of an audio signal reconstructed by a decoder side.

In a possible embodiment, the K channel pairs include a current channel pair; and the method may further include: performing energy/amplitude equalization on audio signals of two channels in the current channel pair in the K channel pairs, to obtain respective energy/amplitudes of the audio signals of the two channels in the current channel pair after energy/amplitude equalization.

In this embodiment, energy/amplitude equalization is performed on audio signals of two channels in a single channel pair, so that a relatively large energy/amplitude difference can still be maintained between channel pairs with a relatively large energy/amplitude difference after energy/amplitude equalization is performed on the channel pairs. In this case, when bits are allocated based on energy/an amplitude after energy/amplitude equalization, more bits may be allocated to a channel pair with larger energy/a larger amplitude, so as to ensure that encoding bits of the channel pair with the larger energy/amplitude meet an encoding requirement of the channel pair. In this way, quality of an audio signal reconstructed by a decoder side is improved.

In a possible embodiment, the K channel pairs include a current channel pair. The encoding the audio signals of the P channels based on the respective bit quantities of the K channel pairs may include: determining respective bit quantities of two channels in the current channel pair based on the bit quantity of the current channel pair and respective energy/amplitudes of audio signals of the two channels in the current channel pair after stereo processing; and encoding the audio signals of the two channels based on the respective bit quantities of the two channels in the current channel pair.

In this embodiment, after the respective bit quantities of the K channel pairs are obtained, bits within the channel pairs may be allocated based on the respective bit quantities of the K channel pairs, to properly allocate bit quantities of channels in multi-channel signal encoding, thereby ensuring quality of an audio signal reconstructed by a decoder side.

In a possible embodiment, the determining respective bit quantities of the K channel pairs based on the respective energy/amplitudes of the audio signals of the P channels and a quantity of available bits may include: determining an energy/amplitude sum of the current frame based on the respective energy/amplitudes of the audio signals of the P channels; determining respective bit coefficients of the K channel pairs based on the respective energy/amplitudes of the audio signals of the K channel pairs and the energy/amplitude sum of the current frame; and determining the respective bit quantities of the K channel pairs based on the respective bit coefficients of the K channel pairs and the quantity of available bits.

In a possible embodiment, the determining an energy/amplitude sum of the current frame based on the respective energy/amplitudes of the audio signals of the P channels may include: determining the energy/amplitude sum of the current frame based on respective energy/amplitudes of the audio signals of the P channels after stereo processing.

In this embodiment, energy/amplitude equalization can be performed for two channels in a single channel pair, so that a relatively large energy/amplitude difference can still be maintained between channel pairs with a relatively large energy/amplitude difference after energy/amplitude equalization is performed on the channel pairs. In this case, when bits are allocated based on energy/an amplitude after energy/amplitude equalization, more bits may be allocated to a channel pair with larger energy/a larger amplitude, so as to ensure that encoding bits of the channel pair with the larger energy/amplitude meet an encoding requirement of the channel pair. In this way, quality of an audio signal reconstructed by a decoder side is improved.

In a possible embodiment, the determining the energy/amplitude sum of the current frame based on respective energy/amplitudes of the audio signals of the P channels after stereo processing may include: calculating the energy/amplitude sum $sum\_E_{post}$ of the current frame according to a formula $$sum\_E_{post} = \sum_{ch=1}^{P} E_{post}(ch), \text{ where}$$

$$E_{post}(ch) = \left(\sum_{i=1}^{N} sampleCoef_{post}(ch, i) \times sampleCoef_{post}(ch, i)\right)^{1/2},$$

where ch represents a channel index, $E_{post}(ch)$ represents energy/an amplitude of an audio signal of a channel with a channel index ch after stereo processing, $sampleCoef_{post}(ch, i)$ represents an $i^{th}$ coefficient of the current frame of a $(ch)^{th}$ channel after stereo processing, and N represents a quantity of coefficients of the current frame and is a positive integer greater than 1.

In a possible embodiment, the determining an energy/amplitude sum of the current frame based on the respective energy/amplitudes of the audio signals of the P channels may include: determining the energy/amplitude sum of the current frame based on respective energy/amplitudes of the audio signals of the P channels before energy/amplitude equalization, where energy/an amplitude of an audio signal of one of the P channels before energy/amplitude equalization includes energy/an amplitude of the audio signal of the one channel in time domain, energy/an amplitude of the audio signal of the one channel after time-frequency transform, or energy/an amplitude of the audio signal of the one channel after time-frequency transform and whitening.

In this embodiment, the energy/amplitude sum of the current frame is determined based on the respective energy/amplitudes of the audio signals of the P channels in the current frame before energy/amplitude equalization, to perform a bit allocation based on the energy/amplitude sum of the current frame, that is, bits are allocated based on energy/an amplitude before energy/amplitude equalization. In this way, bit quantities of channels in multi-channel signal encoding can be properly allocated, to ensure quality of an audio signal reconstructed by a decoder side. In this embodiment, a problem that encoding bits of signals of a channel pair with larger energy/a larger amplitude are insufficient can be resolved, to ensure quality of an audio signal reconstructed by a decoder side.

In comparison with the bit allocation performed based on the energy/an amplitude after energy/amplitude equalization, in the bit allocation performed based on the energy/amplitude before energy/amplitude equalization, bit quantities of channels in multi-channel signal encoding can be properly allocated, and bit allocation processing can be decoupled from energy/amplitude equalization processing. In other words, bit allocation processing is not affected by energy/amplitude equalization processing. For example, even if a manner of averaging energy/amplitudes of all channels is used in an energy/amplitude equalization processing procedure, in this embodiment, bits are allocated based on energy/an amplitude before energy/amplitude equalization, so that bit quantities of channels in multi-channel signal encoding can be properly allocated. In this way, more encoding bits are allocated to a channel signal with larger energy/a larger amplitude, to ensure quality of an audio signal reconstructed by a decoder side.

In a possible embodiment, the determining the energy/amplitude sum of the current frame based on respective energy/amplitudes of the audio signals of the P channels before energy/amplitude equalization may include:

calculating the energy/amplitude sum $sum\_E_{pre}$ of the current frame according to a formula $$sum\_E_{pre} = \sum_{ch=1}^{P} E_{pre}(ch),$$

where ch represents a channel index, and $E_{pre}(ch)$ represents energy/an amplitude of an audio signal of a channel with a channel index ch before energy/amplitude equalization.

In a possible embodiment, the determining an energy/amplitude sum of the current frame based on the respective energy/amplitudes of the audio signals of the P channels may include: determining the energy/amplitude sum of the current frame based on respective energy/amplitudes of the audio signals of the P channels before energy/amplitude equalization and respective weighting coefficients of the P channels, where the weighting coefficient is less than or equal to 1.

In this embodiment, weighting coefficients are used to adjust bit quantities of channels in multi-channel signal encoding, to properly allocate the bit quantities of channels in multi channel signal encoding.

In a possible embodiment, the determining the energy/amplitude sum based on respective energy/amplitudes of the audio signals of the P channels before energy/amplitude equalization and respective weighting coefficients of the P channels may include: calculating the energy/amplitude sum $sum\_E_{pre}$ of the current frame according to a formula $$sum\_E_{pre} = \sum_{ch=1}^{P} \alpha(ch) * E_{pre}(ch),$$

where ch represents a channel index, $E_{pre}(ch)$ represents energy/an amplitude of an audio signal of a $(ch)^{th}$ channel before energy/amplitude equalization, α(ch) represents a weighting coefficient of the $(ch)^{th}$ channel, weighting coefficients of two channels in one channel pair are the same, and values of the weighting coefficients of the two channels in the one channel pair are inversely proportional to a normalized correlation value between the two channels in the one channel pair.

In this embodiment, weighting coefficients are used to adjust bit quantities of channels in multi-channel signal encoding. Values of weighting coefficients of two channels in a channel pair are inversely proportional to a normalized correlation value of the two channels in the one channel pair, that is, the weighting coefficients are used to increase a bit quantity of a channel pair with low correlation. In this way, an encoding effect is enhanced, to ensure quality of an audio signal reconstructed by a decoder side.

In a possible embodiment, the audio signals of the P channels further include audio signals of Q uncoupled channels, where P=2×K+Q, and Q is a positive integer. The determining respective bit quantities of the K channel pairs based on the respective energy/amplitudes of the audio signals of the P channels and a quantity of available bits may include: determining the respective bit quantities of the K channel pairs and respective bit quantities of the Q channels based on the respective energy/amplitudes of the audio signals of the P channels and the quantity of available bits. The encoding the audio signals of the P channels based on the respective bit quantities of the K channel pairs may include: encoding the audio signals of the K channel pairs based on the respective bit quantities of the K channel pairs, and encoding the audio signals of the Q channels based on the respective bit quantities of the Q channels. One of the Q channels may be a mono channel, or may be a channel obtained through downmixing.

In a possible embodiment, the determining the respective bit quantities of the K channel pairs and respective bit quantities of the Q channels based on the respective energy/amplitudes of the audio signals of the P channels and the quantity of available bits may include: determining the energy/amplitude sum of the current frame based on the respective energy/amplitudes of the audio signals of the P channels; determining the respective bit coefficients of the K channel pairs based on the respective energy/amplitudes of the audio signals of the K channel pairs and the energy/amplitude sum of the current frame; determining respective bit coefficients of the Q channels based on respective energy/amplitudes of the audio signals of the Q channels and the energy/amplitude sum of the current frame; determining the respective bit quantities of the K channel pairs based on the respective bit coefficients of the K channel pairs and the quantity of available bits; and determining the respective bit quantities of the Q channels based on the respective bit coefficients of the Q channels and the quantity of available bits.

In a possible embodiment, the encoding the audio signals of the P channels based on the respective bit quantities of the K channel pairs may include: encoding, based on the respective bit quantities of the K channel pairs, audio signals of the P channels after energy/amplitude equalization.

In this embodiment, the audio signals of the P channels after energy/amplitude equalization may be encoded, where the audio signals of the P channels after energy/amplitude equalization may be obtained by performing energy/amplitude equalization on the audio signals of the P channels. The encoding may include stereo processing, entropy encoding, and the like. This can improve encoding efficiency and enhance an encoding effect.

According to a second aspect, an embodiment of this application provides a multi channel audio signal encoding apparatus. The multi-channel audio signal encoding apparatus may be an audio encoder, a chip of an audio encoding device, or a system on chip; or may be a functional module that is in an audio encoder and that is configured to implement the method in any one of the first aspect or the possible embodiments of the first aspect. The multi-channel audio signal encoding apparatus can implement functions performed in the first aspect or the possible embodiments of the first aspect, and the functions may be implemented by hardware executing corresponding software. The hardware or the software includes one or more modules corresponding to the foregoing functions. For example, in a possible embodiment, the multi channel audio signal encoding apparatus may include: an obtaining module, configured to obtain audio signals of P channels in a current frame of a multi-channel audio signal and respective energy/amplitudes of the audio signals of the P channels, where P is a positive integer greater than 1, the audio signals of the P channels include audio signals of K channel pairs, and K is a positive integer; a bit allocation module, configured to determine respective bit quantities of the K channel pairs based on the respective energy/amplitudes of the audio signals of the P channels and a quantity of available bits; and an encoding module, configured to encode the audio signals of the P channels based on the respective bit quantities of the K channel pairs to obtain an encoded bitstream.

Energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing.

In a possible embodiment, the K channel pairs include a current channel pair. The encoding module is configured to: determine respective bit quantities of two channels in the current channel pair based on the bit quantity of the current channel pair and respective energy/amplitudes of audio signals of the two channels in the current channel pair after stereo processing; and encode the audio signals of the two channels based on the respective bit quantities of the two channels in the current channel pair.

In a possible embodiment, the bit allocation module is configured to: determine an energy/amplitude sum of the current frame based on the respective energy/amplitudes of the audio signals of the P channels; determine respective bit coefficients of the K channel pairs based on the respective energy/amplitudes of the audio signals of the K channel pairs and the energy/amplitude sum of the current frame; and determine the respective bit quantities of the K channel pairs based on the respective bit coefficients of the K channel pairs and the quantity of available bits.

In a possible embodiment, the bit allocation module is configured to determine the energy/amplitude sum of the current frame based on respective energy/amplitudes of the audio signals of the P channels after stereo processing.

In a possible embodiment, the bit allocation module is configured to calculate the energy/amplitude sum sum_$E_{post}$ of the current frame according to a formula $$\text{sum\_E}_{post}=\sum_{ch=1}^{P}E_{post}(ch),$$

where $$E_{post}(ch)=\left(\sum_{i=1}^{N}sampleCoef_{post}(ch,i)\times sampleCoef_{post}(ch,i)\right)^{1/2},$$

where ch represents a channel index, $E_{post}$(ch) represents energy/an amplitude of an audio signal of a channel with a channel index ch after stereo processing, sampleCoef$_{post}$(ch, i) represents an $i^{th}$ coefficient of the current frame of a $(ch)^{th}$ channel after stereo processing, and N represents a quantity of coefficients of the current frame and is a positive integer greater than 1.

In a possible embodiment, the bit allocation module is configured to: determine the energy/amplitude sum of the current frame based on respective energy/amplitudes of the audio signals of the P channels before energy/amplitude equalization, where energy/an amplitude of an audio signal of one of the P channels before energy/amplitude equalization includes energy/an amplitude of the audio signal of the one channel in time domain, energy/an amplitude of the audio signal of the one channel after time-frequency transform, or energy/an amplitude of the audio signal of the one channel after time-frequency transform and whitening.

In a possible embodiment, the bit allocation module is configured to calculate the energy/amplitude sum sum_$E_{pre}$ of the current frame according to a formula $$\text{sum\_E}_{pre}=\sum_{ch=1}^{P}E_{pre}(ch),$$

where ch represents a channel index, and $E_{pre}$(ch) represents energy/an amplitude of an audio signal of a channel with a channel index ch before energy/amplitude equalization.

In a possible embodiment, the bit allocation module is configured to determine the energy/amplitude sum of the current frame based on respective energy/amplitudes of the audio signals of the P channels before energy/amplitude equalization and respective weighting coefficients of the P channels, where the weighting coefficient is less than or equal to 1.

In a possible embodiment, the bit allocation module is configured to:

calculate the energy/amplitude sum sum_$E_{pre}$ of the current frame according to a formula $$\text{sum\_E}_{pre}=\sum_{ch=1}^{P}\alpha(ch)*E_{pre}(ch),$$

where ch represents a channel index, $E_{pre}$(ch) represents energy/an amplitude of an audio signal of a $(ch)^{th}$ channel before energy/amplitude equalization, α(ch) represents a weighting coefficient of the $(ch)^{th}$ channel, weighting coefficients of two channels in one channel pair are the same, and values of the weighting coefficients of the two channels in the one channel pair are inversely proportional to a normalized correlation value between the two channels in the one channel pair.

In a possible embodiment, the audio signals of the P channels further include audio signals of Q uncoupled channels, where P=2×K+Q, K is a positive integer, and Q is a positive integer. The bit allocation module is configured to determine the respective bit quantities of the K channel pairs and respective bit quantities of the Q channels based on the respective energy/amplitudes of the audio signals of the P channels and the quantity of available bits. The encoding module is configured to: encode the audio signals of the K channel pairs based on the respective bit quantities of the K channel pairs, and encode the audio signals of the Q channels based on the respective bit quantities of the Q channels.

In a possible embodiment, the bit allocation module is configured to determine the energy/amplitude sum of the current frame based on the respective energy/amplitudes of the audio signals of the P channels; determine the respective bit coefficients of the K channel pairs based on the respective energy/amplitudes of the audio signals of the K channel pairs and the energy/amplitude sum of the current frame; determine respective bit coefficients of the Q channels based on respective energy/amplitudes of the audio signals of the Q channels and the energy/amplitude sum of the current frame; determine the respective bit quantities of the K channel pairs based on the respective bit coefficients of the K channel pairs and the quantity of available bits; and determine the respective bit quantities of the Q channels based on the respective bit coefficients of the Q channels and the quantity of available bits.

In a possible embodiment, the encoding module is configured to encode, based on the respective bit quantities of the K channel pairs, audio signals of the P channels after energy/amplitude equalization.

In an embodiment, the apparatus may further include an energy/amplitude equalization module. The energy/amplitude equalization module is configured to obtain, based on the audio signals of the P channels, the audio signals of the P channels after energy/amplitude equalization.

According to a third aspect, an embodiment of this application provides a multi-channel audio signal encoding method. The method may include: obtaining audio signals of P channels in a current frame of a multi-channel audio signal, where P is a positive integer greater than 1, the audio signals of the P channels include audio signals of K channel pairs, and K is a positive integer; performing energy/amplitude equalization on audio signals of two channels in a current channel pair in the K channel pairs based on respective energy/amplitudes of the audio signals of the two channels in the current channel pair, to obtain respective energy/amplitudes of the audio signals of the two channels in the current channel pair after energy/amplitude equalization; determining respective bit quantities of the two channels in the current channel pair based on the respective energy/amplitudes of the audio signals of the two channels in the current channel pair after energy/amplitude equalization and a quantity of available bits; and encoding the audio signals of the two channels based on the respective bit quantities of the two channels in the current channel pair, to obtain an encoded bitstream.

In this embodiment, energy/amplitude equalization can be performed for two channels in a single channel pair, so that a relatively large energy/amplitude difference can still be maintained between channel pairs with a relatively large energy/amplitude difference after energy/amplitude equalization is performed on the channel pairs. In this case, when bits are allocated based on energy/an amplitude after energy/amplitude equalization, more bits may be allocated to a channel pair with larger energy/a larger amplitude, so as to ensure that encoding bits of the channel pair with the larger energy/amplitude meet an encoding requirement of the channel pair. In this way, quality of an audio signal reconstructed by a decoder side is improved.

In a possible embodiment, P=2×K, and K is a positive integer. The determining respective bit quantities of the two channels in the current channel pair based on the respective energy/amplitudes of the audio signals of the two channels in the current channel pair after energy/amplitude equalization and a quantity of available bits may include: determining an energy/amplitude sum of the current frame based on respective energy/amplitudes of the audio signals of the P channels after energy/amplitude equalization; and determining the respective bit quantities of the two channels in the current channel pair based on the energy/amplitude sum of the current frame, the respective energy/amplitudes of the audio signals of the two channels in the current channel pair after energy/amplitude equalization, and the quantity of available bits.

In a possible embodiment, the audio signals of the P channels further include audio signals of Q uncoupled channels, where P=2×K+Q, K is a positive integer, and Q is a positive integer. The determining respective bit quantities of the two channels in the current channel pair based on the respective energy/amplitudes of the audio signals of the two channels in the current channel pair after energy/amplitude equalization and the quantity of available bits may include: determining the energy/amplitude sum of the current frame based on energy/amplitudes of audio signals of two channels in each of the K channel pairs after energy/amplitude equalization and energy/amplitudes of the audio signals of the Q channels after energy/amplitude equalization; determining the respective bit quantities of the two channels in the current channel pair based on the energy/amplitude sum of the current frame, the respective energy/amplitudes of the audio signals of the two channels in the current channel pair, and the quantity of available bits; and determining respective bit quantities of the Q channels based on the energy/amplitude sum of the current frame, the respective energy/amplitudes of the audio signals of the Q channels after energy/amplitude equalization, and the quantity of available bits. The encoding the audio signals of the two channels based on the respective bit quantities of the two channels in the current channel pair, to obtain an encoded bitstream may include: encoding the audio signals of the K channel pairs based on the respective bit quantities of the K channel pairs, and encoding the audio signals of the Q channels based on the respective bit quantities of the Q channels, to obtain the encoded bitstream.

According to a fourth aspect, an embodiment of this application provides a multi channel audio signal encoding apparatus. The multi-channel audio signal encoding apparatus may be an audio encoder, a chip of an audio encoding device, or a system on chip; or may be a functional module that is in an audio encoder and that is configured to implement the method in any one of the third aspect or the possible embodiments of the third aspect. The multi-channel audio signal encoding apparatus can implement functions performed in the third aspect or the possible embodiments of the third aspect, and the functions may be implemented by hardware executing corresponding software. The hardware or the software includes one or more modules corresponding to the foregoing functions. For example, in a possible embodiment, the multi channel audio signal encoding apparatus may include: an obtaining module, configured to obtain audio signals of P channels in a current frame of a multi-channel audio signal, where P is a positive integer greater than 1, the audio signals of the P channels include audio signals of K channel pairs, and K is a positive integer; an energy/amplitude equalization module, configured to perform energy/amplitude equalization on audio signals of two channels in a current channel pair in the K channel pairs based on respective energy/amplitudes of the audio signals of the two channels in the current channel pair, to obtain respective energy/amplitudes of the audio signals of the two channels in the current channel pair after energy/amplitude equalization; a bit allocation module, configured to determine respective bit quantities of the two channels in the current channel pair based on the respective energy/amplitudes of the audio signals of the two channels in the current channel pair after energy/amplitude equalization and a quantity of available bits; and an encoding module, configured to encode the audio signals of the two channels based on the respective bit quantities of the two channels in the current channel pair, to obtain an encoded bitstream.

In a possible embodiment, P=2×K, K is a positive integer. The bit allocation module is configured to: determine an energy/amplitude sum of the current frame based on respective energy/amplitudes of the audio signals of the P channels after energy/amplitude equalization; and determine the respective bit quantities of the two channels in the current channel pair based on the energy/amplitude sum of the current frame, the respective energy/amplitudes of the audio signals of the two channels in the current channel pair after energy/amplitude equalization, and the quantity of available bits.

In a possible embodiment, the audio signals of the P channels further include audio signals of Q uncoupled channels, where P=2×K+Q, K is a positive integer, and Q is a positive integer. The bit allocation module is configured to: determine the energy/amplitude sum of the current frame based on energy/amplitudes of audio signals of two channels in each of the K channel pairs after energy/amplitude equalization and energy/amplitudes of the audio signals of the Q channels after energy/amplitude equalization; determine the respective bit quantities of the two channels in the current channel pair based on the energy/amplitude sum of the current frame, the respective energy/amplitudes of the audio signals of the two channels in the current channel pair, and the quantity of available bits; and determine respective bit quantities of the Q channels based on the energy/amplitude sum of the current frame, the respective energy/amplitudes of the audio signals of the Q channels after energy/amplitude equalization, and the quantity of available bits. The encoding module is configured to: encode the audio signals of the K channel pairs based on the respective bit quantities of the K channel pairs, and encode the audio signals of the Q channels based on the respective bit quantities of the Q channels, to obtain the encoded bitstream.

According to a fifth aspect, an embodiment of this application provides an audio signal encoding apparatus, including a non-volatile memory and a processor that are coupled to each other. The processor invokes program code stored in the memory, to perform the method according to any one of the first aspect or the possible embodiments of the first aspect, or perform the method according to any one of the third aspect or the possible embodiments of the third aspect.

According to a sixth aspect, an embodiment of this application provides an audio signal encoding device, including an encoder. The encoder is configured to perform the method according to any one of the first aspect or the possible embodiments of the first aspect, or perform the method according to any one of the third aspect or the possible embodiments of the third aspect.

According to a seventh aspect, an embodiment of this application provides a computer-readable storage medium, including a computer program. When the computer program is executed on a computer, the computer is enabled to perform the method according to any one of the first aspect or the possible embodiments of the first aspect, or perform the method according to any one of the third aspect or the possible embodiments of the third aspect.

According to an eighth aspect, an embodiment of this application provides a computer-readable storage medium, including the encoded bitstream obtained according to the method in any one of the first aspect or the possible embodiments of the first aspect, or the encoded bitstream obtained according to the method in any one of the third aspect or the possible embodiments of the third aspect.

According to a ninth aspect, this application provides a computer program product. The computer program product includes a computer program; and when the computer program is executed by a computer, the computer program is used to perform the method according to any one of the first aspect or the possible embodiments of the first aspect, or perform the method according to any one of the third aspect or the possible embodiments of the third aspect.

According to a tenth aspect, this application provides a chip, including a processor and a memory. The memory is configured to store a computer program, and the processor is configured to invoke and run the computer program stored in the memory, to perform the method according to any one of the first aspect or the possible embodiments of the first aspect, or perform the method according to any one of the third aspect or the possible embodiments of the third aspect.

According to the multi-channel audio signal encoding method and apparatus in the embodiments of this application, the audio signals of the P channels in the current frame of the multi-channel audio signal are obtained, where the audio signals of the P channels include the audio signals of the K channel pairs; the respective bit quantities of the K channel pairs are determined based on the respective energy/amplitudes of the audio signals of the P channels and the quantity of available bits; and the audio signals of the P channels are encoded based on the respective bit quantities of the K channel pairs, to obtain the encoded bitstream. Energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing. Bits are allocated to the channel pairs based on at least one of: respective energy/amplitudes of the audio signals of the P channels in time domain, respective energy/amplitudes of the audio signals of the P channels after time-frequency transform, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing, to determine the respective bit quantities of the K channel pairs. In this way, the bit quantities of the channel pairs in multi-channel signal encoding are properly allocated, to ensure quality of an audio signal reconstructed by a decoder side. For example, when an energy/amplitude difference between channel pairs is relatively large, the method in the embodiments of this application can be used to resolve a problem that encoding bits of a channel pair with larger energy/a larger amplitude are insufficient, so as to ensure quality of an audio signal reconstructed by a decoder side.

DESCRIPTION OF EMBODIMENTS

Terms such as "first" and "second" in the embodiments of this application are only used for distinguishment and description, but cannot be understood as indicating or implying relative importance or a sequence. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that, in this application, "at least one" means one or more, and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" generally represents an "or" relationship between associated objects. "At least one of the following" or a similar expression thereof indicates any combination of the following, including any combination of one or more of the following. For example, at least one of a, b, or c may represent: a, b, c, "a and b", "a and c", "b and c", or "a, b and c". Each of a, b, and c may be single or plural. Alternatively, some of a, b, and c may be single; and some of a, b, and c may be plural.

Figure 1:
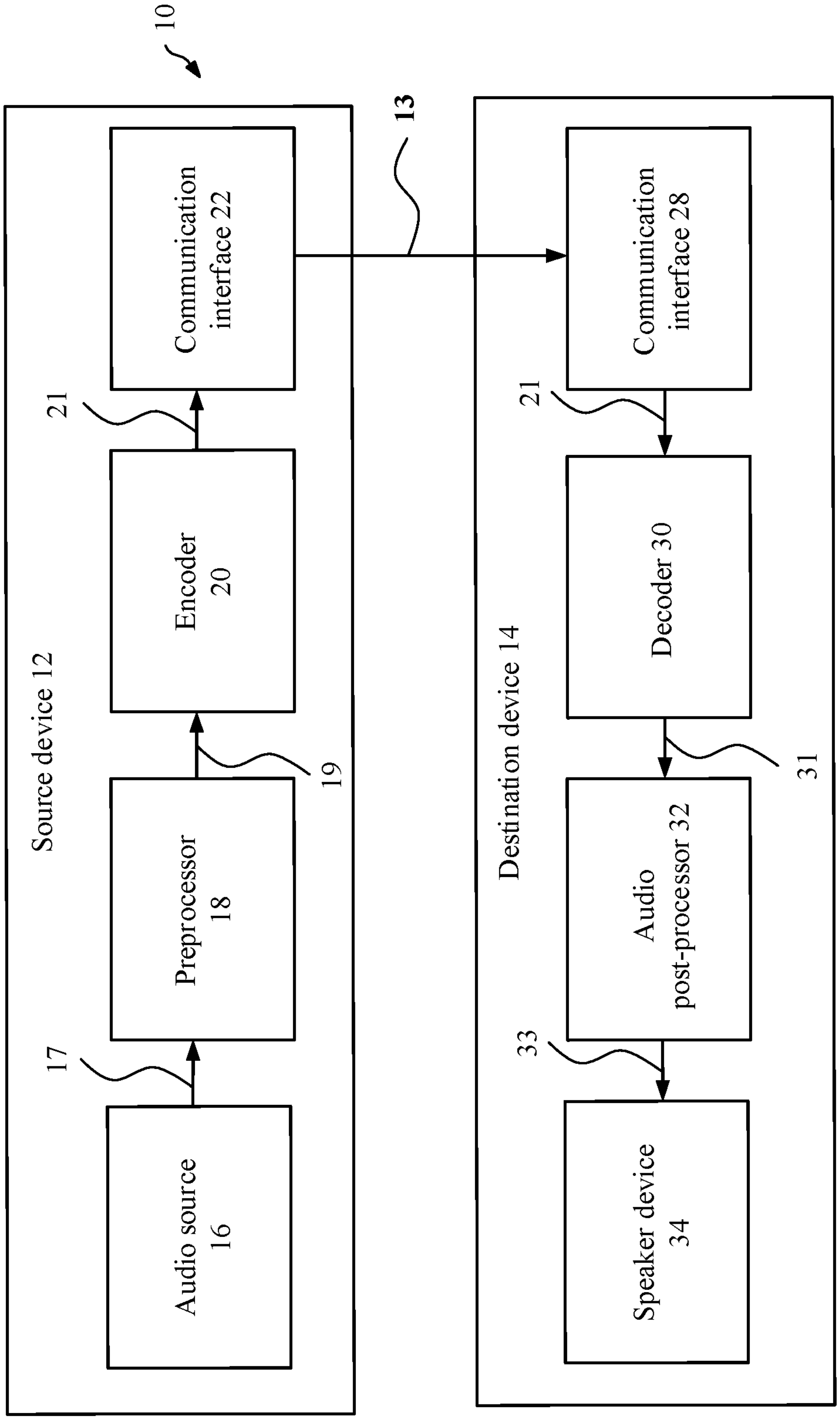
FIG. 1 is a schematic diagram of an example of an audio encoding and decoding system according to an embodiment of this application.

The following describes a system architecture to which the embodiments of this application are applied. FIG. 1 is a schematic block diagram of an example of an audio encoding and decoding system 10 to which an embodiment of this application is applied. As shown in FIG. 1, the audio encoding and decoding system 10 may include a source device 12 and a destination device 14. The source device 12 generates encoded audio data. Therefore, the source device 12 may be referred to as an audio encoding apparatus. The destination device 14 can decode the encoded audio data generated by the source device 12. Therefore, the destination device 14 may be referred to as an audio decoding apparatus. In various embodiments, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, laptop) computer, a tablet, a set-top box, a telephone handset such as a "smart" phone, a television set, a speaker, a digital media player, a video game console, an in-vehicle computer, any wearable device, a virtual reality (VR) device, a server providing a VR service, an augmented reality (AR) device, a server providing an AR service, a wireless communication device, and a similar device thereof.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented over a link 13, and the destination device 14 may receive encoded audio data from the source device 12 over the link 13. The link 13 may include one or more media or apparatuses capable of moving the encoded audio data from the source device 12 to the destination device 14. In an example, the link 13 may include one or more communication media that enable the source device 12 to directly transmit the encoded audio data to the destination device 14 in real time. In this example, the source device 12 can modulate the encoded audio data according to a communication standard (for example, a wireless communication protocol), and can transmit modulated audio data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. In some embodiments, the source device 12 may further include an audio source 16, a preprocessor 18, and a communication interface 22. In an embodiment, the encoder 20, the audio source 16, the preprocessor 18, and the communication interface 22 may be hardware components in the source device 12, or may be software programs in the source device 12. They are separately described are as follows.

The audio source 16 may include or may be a sound capture device of any type, configured to capture, for example, sound from the real world, and/or an audio generation device of any type. The audio source 16 may be a microphone configured to capture sound or a memory configured to store audio data, and the audio source 16 may further include any type of (internal or external) interface for storing previously captured or generated audio data and/or for obtaining or receiving audio data. When the audio source 16 is a microphone, the audio source 16 may be, for example, a local microphone or a microphone integrated into the source device. When the audio source 16 is a memory, the audio source 16 may be, for example, a local memory or a memory integrated into the source device. When the audio source 16 includes an interface, the interface may be, for example, an external interface for receiving audio data from an external audio source. For example, the external audio source is an external sound capture device such as a microphone, an external storage, or an external audio generation device. The interface may be any type of interface, for example, a wired or wireless interface or an optical interface, according to any proprietary or standardized interface protocol.

In this embodiment of this application, the audio data transmitted by the audio source 16 to the preprocessor 18 may also be referred to as raw audio data 17.

The preprocessor 18 is configured to receive and preprocess the raw audio data 17, to obtain preprocessed audio 19 or preprocessed audio data 19. For example, the preprocessing performed by the preprocessor 18 may include filtering or denoising.

The encoder 20 (or referred to as an audio encoder 20) is configured to receive the preprocessed audio data 19, and is configured to perform the embodiments described below, to implement application of the audio signal encoding method described in this application on an encoder side.

The communication interface 22 may be configured to receive the encoded audio data 21, and transmit the encoded audio data 21 to the destination device 14 or any other device (for example, a memory) over the link 13 for storage or direct reconstruction. The other device may be any device used for decoding or storage. The communication interface 22 may be, for example, configured to encapsulate the encoded audio data 21 into an appropriate format, for example, a data packet, for transmission over the link 13.

The destination device 14 includes a decoder 30. In some embodiments, the destination device 14 may further include a communication interface 28, an audio post-processor 32, and a speaker device 34. They are separately described are as follows.

The communication interface 28 may be configured to receive the encoded audio data 21 from the source device 12 or any other source. The any other source is, for example, a storage device. The storage device is, for example, an encoded audio data storage device. The communication interface 28 may be configured to transmit or receive the encoded audio data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the encoded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded audio data transmission.

The decoder 30 (or referred to as a decoder 30) is configured to receive the encoded audio data 21 and provide the decoded audio data 31 or decoded audio 31.

The audio post-processor 32 is configured to post-process the decoded audio data 31 (also referred to as reconstructed audio data) to obtain post-processed audio data 33. The post-processing performed by the audio post-processor 32 may include, for example, rendering or any other processing, and may be further configured to transmit the post-processed audio data 33 to the speaker device 34.

The speaker device 34 is configured to receive the post-processed audio data 33 to play audio to, for example, a user or a viewer. The speaker device 34 may be or may include any type of loudspeaker configured to play reconstructed sound.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software or by using separate hardware and/or software or any combination thereof.

As will be apparent for a person skilled in the art based on the descriptions, existence and (exact) split of functionalities of the different units or functionalities of the source device 12 and/or the destination device 14 shown in FIG. 1 may vary depending on an actual device and application. The source device 12 and the destination device 14 may be any one of a wide range of devices, including any type of handheld or stationary device, for example, a notebook or laptop computer, a mobile phone, a smartphone, a pad or a tablet computer, a video camera, a desktop computer, a set-top box, a television set, a camera, a vehicle-mounted device, a sound box, a digital media player, a video game console, a video streaming transmission device (such as a content service server or a content distribution server), a broadcast receiver device, a broadcast transmitter device, smart glasses, or a smart watch, and may not use or may use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the audio encoding and decoding system 10 shown in FIG. 1 is merely an example, and the technologies of this application is applicable to audio encoding settings (for example, audio encoding or audio decoding) that do not necessarily include any data communication between an encoding device and a decoding device. In another example, data may be retrieved from a local memory, transmitted in a streaming manner through a network, or the like. An audio encoding device may encode data and store data into the memory, and/or an audio decoding device may retrieve and decode data from the memory. In some examples, the encoding and the decoding are performed by devices that do not communicate with one another, but simply encode data to the memory and/or retrieve and decode data from the memory.

The encoder may be a multi-channel encoder, for example, a stereo encoder, a 5.1-channel encoder, or a 7.1-channel encoder.

The audio data may also be referred to as an audio signal. The audio signal in this embodiment of this application is an input signal in the audio encoding device, and the audio signal may include a plurality of frames. For example, a current frame may be a specific frame in the audio signal. In this embodiment of this application, an example in which a current frame of audio signal is encoded and decoded is used for description. A previous frame or a next frame of the current frame in the audio signal may be encoded and decoded in a coding scheme of the current frame of audio signal, and encoding and decoding processes of the previous frame or the next frame of the current frame in the audio signal are not described one by one. In addition, the audio signal in this embodiment of this application may be a multi-channel signal, that is, includes audio signals of P channels. The embodiments of this application are used to implement multi-channel audio signal encoding.

It should be noted that "energy/an amplitude" in the embodiments of this application represents energy or an amplitude. In addition, in an actual processing procedure, if energy processing is performed for a frame at the beginning, energy processing is performed in subsequent processing; or if amplitude processing is performed for a frame at the beginning, amplitude processing is performed in subsequent processing.

The foregoing encoder can perform the multi-channel audio signal encoding method in the embodiments of this application, to properly allocate bit quantities of channels in multi-channel signal encoding, so as to ensure quality of an audio signal reconstructed by a decoder side, and improve encoding quality. For example embodiments, refer to description of the following embodiments.

Figure 2:
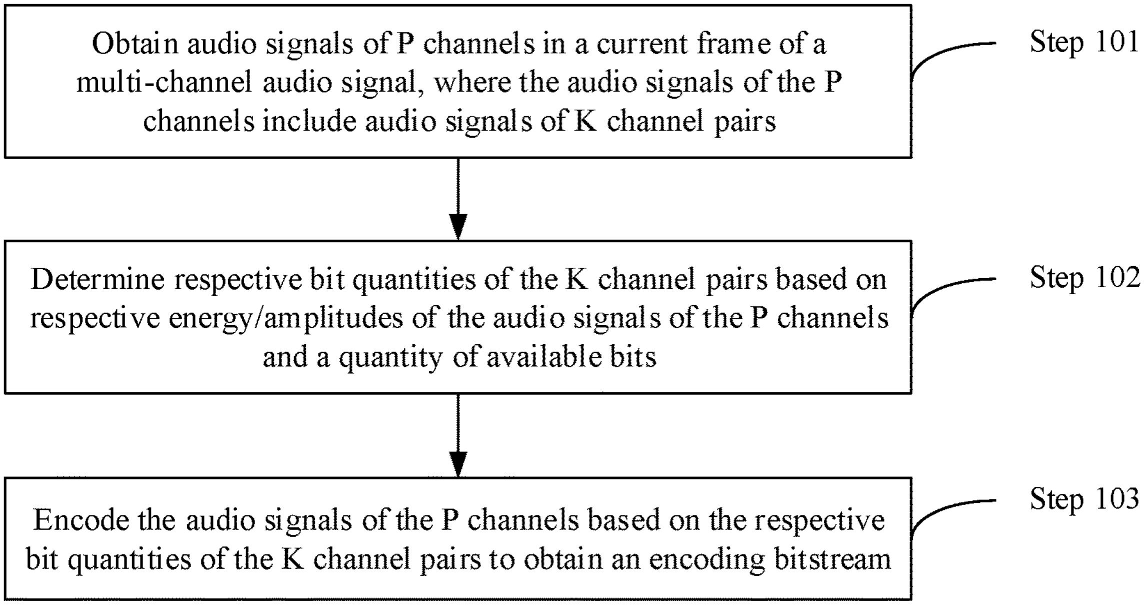
FIG. 2 is a flowchart of a multi-channel audio signal encoding method according to an embodiment of this application.

FIG. 2 is a flowchart of a multi-channel audio signal encoding method according to an embodiment of this application. This embodiment of this application may be executed by the foregoing encoder. As shown in FIG. 2, the method in this embodiment may include the following steps.

Step 101: Obtain audio signals of P channels in a current frame of a multi-channel audio signal, where P is a positive integer greater than 1, and the audio signals of the P channels include audio signals of K channel pairs.

Audio signals of one channel pair include audio signals of two channels. The one channel pair in this embodiment of this application may be any one of the K channel pairs. Audio signals of two coupled (coupling) channels are audio signals of one channel pair.

In some embodiments, P=2K. After multi-channel signal screening, coupling, stereo processing, and multi-channel side information generation, the audio signals of the P channels, that is, the audio signals of the K channel pairs, may be obtained.

In some embodiments, the audio signals of the P channels further include audio signals of Q uncoupled channels, where P=2×K+Q, K is a positive integer, and Q is a positive integer.

After multi-channel signal screening, coupling, stereo processing, and multi-channel side information generation, audio signals of the Q channels on which stereo processing is not performed and the audio signals of the K channel pairs may be obtained. Using signals of 5.1 channels as an example, the 5.1 channels include a left (L) channel, a right (R) channel, a center (C) channel, a low-frequency effects (LFE) channel, a left surround (LS) channel, and a right surround (RS) channel. An L channel signal and an R channel signal are coupled to form a first channel pair. Stereo processing is performed on the first channel pair to obtain a middle channel M1 channel signal and a side channel S1 channel signal. An LS channel signal and an RS channel signal are coupled to form a second channel pair. Stereo processing is performed on the second channel pair to obtain a middle channel M2 channel signal and a side channel S2 channel signal. An LFE channel signal and a C channel signal are uncoupled audio signals. That is, P=6, K=2, and Q=2. The audio signals of the P channels include audio signals of the first channel pair, audio signals of the second channel pair, and the LFE channel signal and the C channel signal on which stereo processing is not performed. The audio signals of the first channel pair include the middle channel M1 channel signal and the side channel S1 channel signal, and the audio signals of the second channel pair include the middle channel M2 channel signal and the side channel S2 channel signal. Middle channels M1 and M2 and side channels S1 and S2 may be considered as the channels obtained through downmixing processing, that is, downmixed channels.

In some embodiments, the P channels do not include the LFE channel. In these embodiments, a fixed quantity of bits may be allocated to the LFE channel regardless of whether an energy/amplitude value of the LFE channel is high or low. For example, the fixed quantity may be a preset value. To be specific, regardless of a quantity of channels included in the multi-channel signal and an encoding bit rate of the multi-channel signal, the fixed quantity is unchanged, for example, is 80, 100, or 120. Alternatively, the fixed quantity may alternatively be determined based on at least one of the following: a quantity of channels included in the multi-channel signal and an encoding bit rate of the multi-channel signal. Generally, a larger quantity of channels indicates a smaller fixed quantity; a higher encoding bit rate indicates a larger fixed quantity. For example, when the multi-channel signal is signals of 5.1 channels, that is, six channels are included, if the encoding bit rate is 192 kbps, the fixed number may be 80, to be specific, 80 bits are allocated to the LFE channel. If the encoding bit rate is 256 kbps, the fixed quantity may be 120, to be specific, 120 bits are allocated to the LFE channel. For example, when the encoding bit rate is 192 kbps, if the multi-channel signal is signals of 7.1 channels, that is, eight channels are included, the fixed quantity may be 60, to be specific, 60 bits are allocated to the LFE channel.

Step 102: Determine respective bit quantities of the K channel pairs based on respective energy/amplitudes of the audio signals of the P channels and a quantity of available bits.

Energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing. The energy/amplitude in time domain, the energy/amplitude after time-frequency transform, and the energy/amplitude after time-frequency transform and the whitening are energy/amplitudes before energy/amplitude equalization. In other words, in a bit allocation process, any one or more of the foregoing energy/amplitudes may be selected for bit allocation.

When the P channels do not include the LFE channel, the quantity of available bits does not include the fixed quantity of bits.

The energy/amplitude of the audio signal of the one channel after time-frequency transform and whitening is energy/an amplitude obtained after time-frequency transform and whitening processing is performed on the audio signal of the one channel, and the whitening processing is performed to make a frequency domain coefficient of the audio signal of the one channel more flat, to facilitate subsequent encoding.

One bit allocation is performed based on the respective energy/amplitudes of the audio signals of the P channels and the quantity of available bits. The one bit allocation herein is a bit allocation for a channel pair. To be specific, a corresponding bit quantity is allocated to a different channel pair.

When P=2K, the respective bit quantities of the K channel pairs are determined based on the respective energy/amplitudes of the audio signals of the P channels and the quantity of available bits. The quantity of bits is also referred to as a quantity of initially allocated bits. A channel pair may be used as a basic unit. One bit allocation is performed on the basic unit based on a proportion of energy/an amplitude of a basic unit in energy/amplitudes of all basic units (K basic units). Energy/an amplitude of any basic unit may be determined based on energy/amplitudes of audio signals of two channels in the basic unit. For example, energy/an amplitude of a basic unit may be a sum of energy/amplitudes of audio signals of two channels in the basic unit. Bits may be allocated between different basic units through one bit allocation, to obtain a bit quantity of each basic unit. The quantity of bits is also referred to as a quantity of initially allocated bits.

When P=2×K+Q, the respective bit quantities of the K channel pairs and respective bit quantities of Q channels are determined based on the respective energy/amplitudes of the audio signals of the P channels and the quantity of available bits. A channel pair may be used as a basic unit, and an uncoupled mono channel may be used as a basic unit. One bit allocation is performed on a basic unit based on a proportion of energy/an amplitude of the basic unit in energy/amplitudes of all basic units (K+Q basic units). For basic units corresponding to coupled channels, energy/amplitudes of the basic units may be determined based on energy/amplitudes of audio signals of the two channels in the basic unit. For a basic unit corresponding to an uncoupled channel, energy/an amplitude of the basic unit may be determined based on energy/an amplitude of an audio signal of the single channel. Bits may be allocated between the basic units (the K+Q basic units) through one bit allocation, to obtain a bit quantity of each basic unit. In other words, the respective bit quantities of the K channel pairs and the respective bit quantities of the Q channels. One of the Q channels may be a mono channel, or may be a channel obtained through downmixing processing, that is, a downmixed channel.

Regardless of when P=2K or when P=2×K+Q, in an embodiment, the respective bit quantities of the K channel pairs may be determined based on the quantity of available bits and any one of: respective energy/amplitudes of the K channel pairs in time domain, respective energy/amplitudes of the K channel pairs after time-frequency transform, or respective energy/amplitudes of the K channel pairs after time-frequency transform and whitening. In this embodiment, energy/amplitude equalization may be performed on the audio signals of the K channel pairs before bit allocation, to improve encoding efficiency and an encoding effect. A manner of performing energy/amplitude equalization on the audio signals of the K channel pairs may be performing energy/amplitude equalization on audio signals of a plurality of channel pairs, or on audio signals of all of a plurality of channel pairs and one or more uncoupled channels. In this embodiment, the manner of performing energy/amplitude equalization on the audio signals of the K channel pairs may alternatively be performing energy/amplitude equalization on audio signals of two channels in a single channel pair.

In another embodiment, the respective bit quantities of the K channel pairs may be determined based on the quantity of available bits and any one of: respective energy/amplitudes of the audio signals of the K channel pairs after energy/amplitude equalization or respective energy/amplitudes of the audio signals of the K channel pairs after stereo processing. In this embodiment, energy/amplitude equalization may be performed on the audio signals of the K channel pairs before bit allocation, to improve encoding efficiency and an encoding effect. A manner of performing energy/amplitude equalization on the audio signals of the K channel pairs may be performing energy/amplitude equalization on audio signals of two channels in a single channel pair. The respective energy/amplitudes of the audio signals of the K channel pairs after energy/amplitude equalization or the respective energy/amplitudes of the audio signals of the K channel pairs after stereo processing are all obtained after energy/amplitude equalization is performed on the audio signals of the two channels in the single channel pair.

Similar to determining of the respective bit quantities of the K channel pairs, when P=2×K+Q, in an embodiment, respective bit quantities of the Q channels may be determined based on the quantity of available bits and any one of: respective energy/amplitudes of the audio signals of the Q channels in time domain, respective energy/amplitudes of the audio signals of the Q channels after time-frequency transform, or respective energy/amplitude of the audio signals of the Q channels after time-frequency transform and whitening. In another embodiment, the respective bit quantities of the Q channels may be determined based on the quantity of available bits and any one of: respective energy/amplitudes of the audio signals of the Q channels after energy/amplitude equalization or respective energy/amplitudes of the audio signals of the Q channels after stereo processing. The respective energy/amplitudes of the audio signals of the Q channels after energy/amplitude equalization or the respective energy/amplitudes of the audio signals of the Q channels after stereo processing is/are equal to energy/amplitudes before energy/amplitude equalization or stereo processing.

In some embodiments, encoding quality of a single channel is not improved after a quantity of bits allocated to the channel is greater than a threshold. Therefore, the threshold may be preset. In this case, the threshold is considered in a process of performing bit allocation on the channel, so that the quantity of bits allocated to the single channel does not exceed the threshold regardless of whether an energy/amplitude value of the single channel is high. In this way, more bits can be allocated to other channels, to improve encoding quality of the other channels without degrading the encoding quality of the single channel, and improve encoding quality of the entire signal.

Correspondingly, in some embodiments, the determining respective bit quantities of the K channel pairs may further include the following steps:

determining an $M^{th}$ channel in the P channels whose quantity of initially allocated bits is greater than a threshold, where M is greater than or equal to 0 and less than P;

obtaining a quantity of redundant bits of the $M^{th}$ channel, where quantity of redundant bits of the $M^{th}$ channel=quantity of initially allocated bits of the $M^{th}$ channel-threshold; and if the $M^{th}$ channel is a channel that is first determined in the P channels and whose quantity of initially allocated bits is greater than the threshold, allocating the redundant bits to (P-1) channels in the P channels other than the $M^{th}$ channel, so as to obtain quantities of updated bits of the (P-1) channels, where a quantity of updated bits of the $M^{th}$ channel is the threshold; or if the $M^{th}$ audio channel is a channel that is not first determined and whose quantity of initially allocated bits is greater than the threshold, allocating the redundant bits to channels, other than the $M^{th}$ channel and the channel that is determined and whose quantity of initially allocated bits is greater than the threshold, in the P channels, so as to obtain quantities of updated bits of the other channels. For example, if the channel that is determined and whose quantity of initially allocated bits is greater than the threshold is an $N^{th}$ channel, the other channels include (P-2) channels, other than the $M^{th}$ channel and the $N^{th}$ channel, in the P channels. It should be noted that, if a fixed quantity of bits are allocated to the LFE channel, the P channels do not include the LFE channel.

If a bit quantity threshold of a single channel is frmBitMax, frmBitMax can be calculated based on a saturated encoding bit rate, a frame length, and an encoding sampling rate of the single channel according to the following formula:

$$\text{frmBitMax}=\text{rateMax}\times\text{frameLen}/fs,\text{ where}$$

rateMax represents the saturated encoding bit rate of the single channel, frameLen represents the frame length, and fs represents the encoding sampling rate. Usually, rateMax may be 256000 bps, 240000 bps, 224000 bps, 192000 bps, or the like. A value of rateMax may be selected based on encoding efficiency of an encoder, or may be set based on an empirical value. This is not limited herein.

For example, the multi-channel signal is signals of 5.1 channels. An L channel and an R channel are coupled and downmixed to obtain an M1 channel and an S1 channel, and an LS channel and an RS channel are coupled and downmixed to obtain an M2 channel and an S2 channel. Bits(M1) represents a quantity of initially allocated bits of the M1 channel, Bits(S1) represents a quantity of initially allocated bits of the S1 channel, Bits(M2) represents a quantity of initially allocated bits of the M2 channel, Bits(S2) represents a quantity of initially allocated bits of the S2 channel, and quantities of initially allocated bits of channels that do not participate in coupling are Bits(C) and Bits(LFE). If a fixed quantity of bits are allocated to the LFE channel, quantity of available bits=Bits(M1)+Bits(S1)+Bits(M2)+Bits(S2)+Bits(C); or if a variable quantity of bits are allocated to the LFE channel, quantity of available bits=Bits(M1)+Bits(S1)+Bits(M2)+Bits(S2)+Bits(C)+Bits(LFE).

The following provides description by using an example in which a fixed quantity of bits are allocated to the LFE channel.

The quantity of available bits is expressed as totalBits, and the threshold is expressed as frmBitMax. Set allocFlag[5]={0, 0, 0, 0, 0}. In this case, if 5.1 channels have been sorted, M1=0, S1=1, C=2, M2=3, and S2=4, the following procedure is performed:

Step 1: If Bits(i)<frmBitMax, go to step 5, where allocFlag[i] further is to be set to 1 when Bits(i)=frmBitMax, where 0<i<5.

Step 2: If Bits(i)>frmBitMax, set allocFlag[i]=1, calculate diffBits=Bits(ch)-frmBitMax, and then perform steps 3 to 5.

Step 3: Calculate sumBits=ΣBits(j), where 0≤j≤5, and Bits(j) is not accumulated to sumBits when allocFlag[j]=1.

Step 4: Allocate diffBits to a channel that satisfies allocFlag[j]≠1. Details are as follows:

$$\text{Bits}(j)=\text{Bits}(j)+\text{diffBits}\times\text{Bits}(j)/\text{sumBits}$$

Step 5: If i=4, the procedure ends; or if i<3, i++, go to step 1.

In an embodiment, after step 4 is performed, the following steps may be further performed:

determining whether Bits(j) is greater than or equal to frmBitMax, and setting allocFlag[j] to 1 if Bits(j) is greater than or equal to frmBitMax.

The following is another example in which a fixed quantity of bits are allocated to the LFE channel:

The quantity of available bits is expressed as totalBits, and the threshold is expressed as frmBitMax. Set allocFlag[6]={0, 0, 0, 0, 0, 0}. In this case, if 5.1 channels have been sorted, M1=0, S1=1, C=2, M2=3, S2=4, and LFE=5, the following procedure is performed:

Step 1: If Bits(i)≤frmBitMax, go to step 5, where allocFlag[i] further is to be set to 1 when Bits(i)=frmBitMax, where 0≤i≤6.

Step 2: If Bits(i)>frmBitMax, set allocFlag[i]=1, calculate diffBits=Bits(i)-frmBitMax, and then perform steps 3 to 5.

Step 3: Calculate sumBits=ΣBits(j), where 0≤j≤4, and Bits(j) is not accumulated to sumBits when allocFlag[j]=1.

Step 4: Allocate diffBits to a channel that satisfies allocFlag[j]≠1. Details are as follows:

$$\text{Bits}(j)=\text{Bits}(j)+\text{diffBits}\times\text{Bits}(j)/\text{sumBits}$$

Step 5: If i=4, the procedure ends; or if i<3, i++, go to step 1.

In an embodiment, after step 4 is performed, the following steps may be further performed:

determining whether Bits(j) is greater than or equal to frmBitMax, and setting allocFlag[j] to 1 if Bits(j) is greater than or equal to frmBitMax.

Step 103: Encode the audio signals of the P channels based on the respective bit quantities of the K channel pairs to obtain an encoded bitstream.

The bit quantity may be a quantity of initially allocated bits, or may be a quantity of updated bits.

The encoding the audio signals of the P channels may include performing quantization, entropy encoding, and bitstream multiplexing on the audio signals of the P channels, to obtain the encoded bitstream.

When P=2K, quantization, entropy encoding, and bitstream multiplexing are performed on the audio signals of the P channels based on the respective bit quantities of the K channel pairs, to obtain the encoded bitstream.

When P=2×K+Q, quantization, entropy encoding, and bitstream multiplexing are performed on the audio signals of the P channels based on the respective bit quantities of the K channel pairs and the respective bit quantities of the Q channels, to obtain the encoded bitstream.

In this embodiment, the audio signals of the P channels in the current frame of the multi-channel audio signal are obtained, where the audio signals of the P channels include the audio signals of the K channel pairs; the respective bit quantities of the K channel pairs are determined based on the respective energy/amplitudes of the audio signals of the P channels and the quantity of available bits; and the audio signals of the P channels are encoded based on the respective bit quantities of the K channel pairs to obtain the encoded bitstream. The energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing. Bits are allocated to the channel pairs based on at least one of: respective energy/amplitudes of the audio signals of the P channels in time domain, respective energy/amplitudes of the audio signals of the P channels after time-frequency transform, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing, to determine the respective bit quantities of the K channel pairs. In this way, the bit quantities of the channel pairs in multi-channel signal encoding are properly allocated, to ensure quality of an audio signal reconstructed by a decoder side. For example, when an energy/amplitude difference between channel pairs is relatively large, the method in this embodiment of this application can be used to resolve a problem that encoding bits of a channel pair with larger energy/a larger amplitude are insufficient, so as to ensure quality of an audio signal reconstructed by a decoder side.

Figure 3:
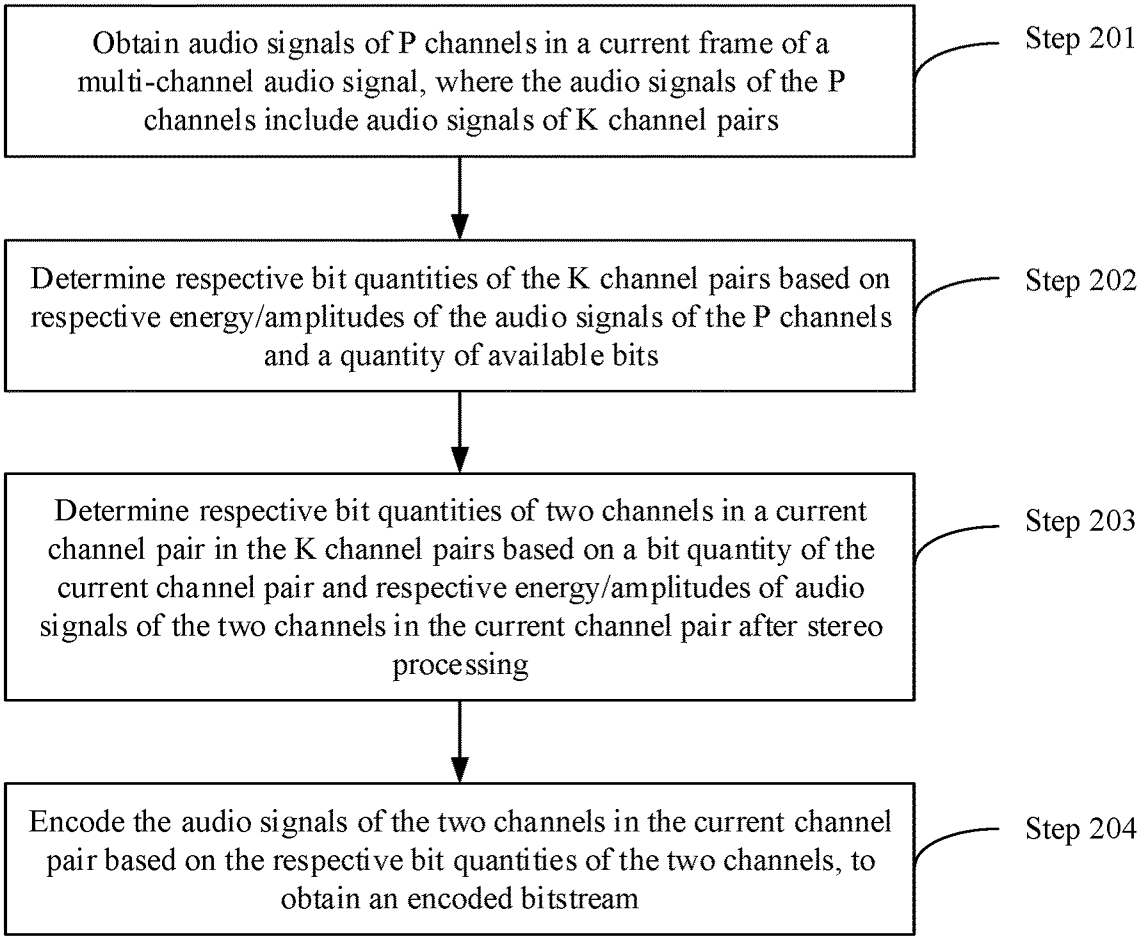
FIG. 3 is a flowchart of a multi-channel audio signal encoding method according to an embodiment of this application.

FIG. 3 is a flowchart of a multi-channel audio signal encoding method according to an embodiment of this application. This embodiment of this application may be executed by the foregoing encoder. As shown in FIG. 3, the method in this embodiment may include the following steps.

Step 201: Obtain audio signals of P channels in a current frame of a multi-channel audio signal, where P is a positive integer greater than 1, and the audio signals of the P channels include audio signals of K channel pairs.

For an example description of step 201, refer to step 101 in the embodiment shown in FIG. 2. Details are not described herein again.

Step 202: Determine respective bit quantities of the K channel pairs based on respective energy/amplitudes of the audio signals of the P channels and a quantity of available bits.

One bit allocation is performed based on the respective energy/amplitudes of the audio signals of the P channels and the quantity of available bits.

When P=2×K, in the one bit allocation process, according to the method in this embodiment of this application, the respective bit quantities of the K channel pairs may be determined based on the respective energy/amplitudes of the audio signals of the P channels and the quantity of available bits.

When P=2×K+Q, in the one bit allocation process, according to the method in this embodiment of this application, the respective bit quantities of the K channel pairs and respective bit quantities of the Q channels may be determined based on the respective energy/amplitudes of the audio signals of the P channels and the quantity of available bits.

Regardless of when P=2K or when P=2×K+Q, for description of determining the respective bit quantities of the K channel pairs and respective bit quantities of the Q channels in step 202, refer to step 102 in the embodiment shown in FIG. 1. Details are not described herein again.

Step 203: Determine respective bit quantities of two channels in a current channel pair in the K channel pairs based on a bit quantity of the current channel pair and respective energy/amplitudes of audio signals of the two channels in the current channel pair after stereo processing.

The current channel pair in the K channel pairs is used as an example. Two bit allocations are performed on the current channel pair based on the bit quantity of the current channel pair in the K channel pairs and the respective energy/amplitudes of the audio signals of the two channels in the current channel pair after stereo processing. The two bit allocations are to allocate the bit quantities of the two channels in the current channel pair. That is, bits within the basic units are allocated to basic units corresponding to the coupled channels based on respective energy/amplitude proportions of the audio signals of the two channels in the basic units. The current channel pair may be any one of the K channel pairs. The two bit allocations herein are bit allocations for two channels in a channel pair, that is, to allocate corresponding bit quantities to the two channels in the channel pair.

Regardless of when P=2K or when P=2×K+Q, bits may be allocated to the channel pair in the manner of the foregoing step 203, to obtain the respective bit quantities of the two channels in the channel pair.

Step 204: Encode the audio signals of the two channels in the current channel pair based on the respective bit quantities of the two channels, to obtain an encoded bitstream.

The encoding the audio signals of the two channels in the current channel pair may include: separately performing quantization, entropy encoding, and bitstream multiplexing on the audio signals of the two channels in the current channel pair, to obtain the encoded bitstream.

When P=2K, quantization, entropy encoding, and bitstream multiplexing are separately performed on the audio signals of the P channels based on the respective bit quantities of the K channel pairs, to obtain the encoded bitstream.

When P=2×K+Q, quantization, entropy encoding, and bitstream multiplexing are separately performed on the audio signals of the K channel pairs based on the respective bit quantities of the K channel pairs, and quantization, entropy encoding, and bitstream multiplexing are separately performed on the audio signals of the Q channels based on the respective bit quantities of the Q channels, to obtain the encoded bitstream.

In this embodiment, the audio signals of the P channels in the current frame of the multi-channel audio signal are obtained, where the audio signals of the P channels include the audio signals of the K channel pairs; the respective bit quantities of the K channel pairs are determined based on the respective energy/amplitudes of the audio signals of the P channels and the quantity of available bits; the respective bit quantities of the two channels in the current channel pair in the K channel pairs are determined based on the respective bit quantities of the K channel pairs, the bit quantity of the current channel pair, and the respective energy/amplitudes of the audio signals of the two channels in the current channel pair after stereo processing; and the audio signals of the two channels are separately encoded based on the respective bit quantities of the two channels in the current channel pair, to obtain the encoded bitstream. Bits are allocated to the channel pairs based on at least one of: respective energy/amplitudes of the audio signals of the P channels in time domain, respective energy/amplitudes of the audio signals of the P channels after time-frequency transform, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing, to determine the respective bit quantities of the K channel pairs. Then bits within the channel pair are allocated based on the respective bit quantities of the K channel pairs. In this way, the bit quantities of the channels in multi-channel signal encoding are properly allocated, to ensure quality of an audio signal reconstructed by a decoder side. For example, when an energy/amplitude difference between channel pairs is relatively large, the method in this embodiment of this application can be used to resolve a problem that encoding bits of signals of a channel pair with larger energy/a larger amplitude are insufficient, so as to ensure quality of an audio signal reconstructed by a decoder side.

Figure 4:
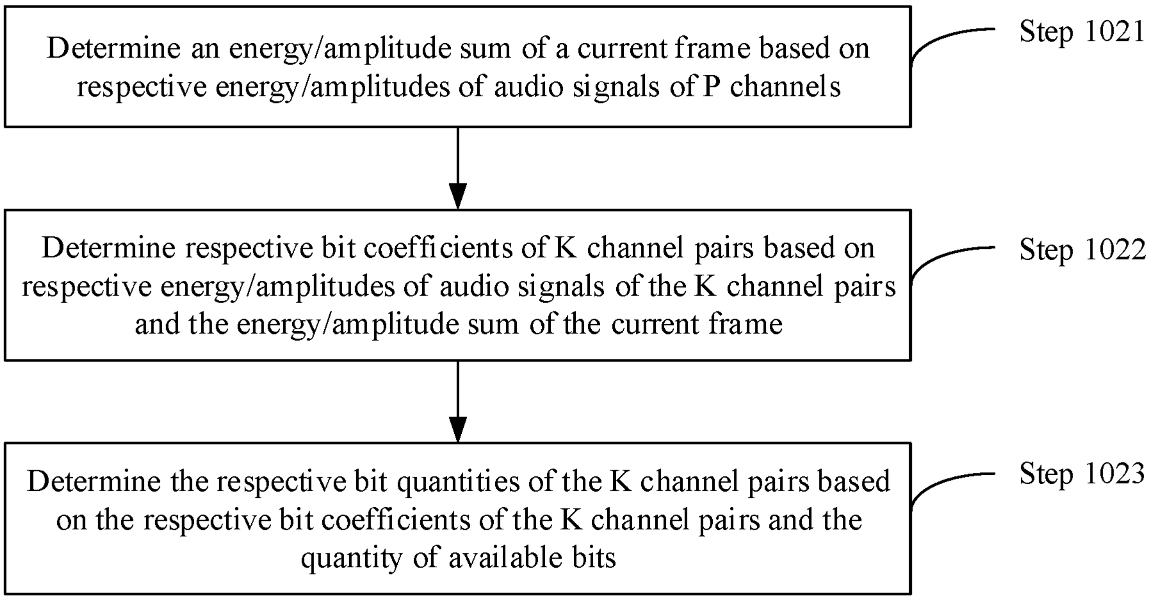
FIG. 4 is a flowchart of a method for allocating bits in a channel pair according to an embodiment of this application.

FIG. 4 is a flowchart of a bit allocation method for a channel pair according to an embodiment of this application. This embodiment of this application may be executed by the foregoing encoder. This embodiment is an example of step 102 in the embodiment shown in FIG. 2. As shown in FIG. 4, the method in this embodiment may include the following steps.

Step 1021: Determine an energy/amplitude sum of the current frame based on respective energy/amplitudes of the audio signals of the P channels.

For example, the respective energy/amplitudes of the audio signals of the P channels includes/include at least one of: respective energy/amplitudes of the audio signals of the P channels in time domain, respective energy/amplitudes of the audio signals of the P channels after time-frequency transform, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing.

A manner of determining the energy/amplitude sum of the current frame for different energy/amplitude types is described.

Manner 1: Determine the energy/amplitude sum of the current frame based on the respective energy/amplitudes of the audio signals of the P channels after stereo processing. The energy/amplitude sum of the current frame may be an energy/amplitude sum $sum\_E_{pos}$ after stereo processing.

For example, the energy/amplitude sum $sum\_E_{post}$ after stereo processing may be determined according to the following formula (1) and formula (2):

$$sum\_E_{post} = \sum_{ch=1}^{P} E_{post}(ch) \quad (1)$$

$$E_{post}(ch) = \left(\sum_{i=1}^{N} sampleCoef_{post}(ch, i) \times sampleCoef_{post}(ch, i)\right)^{1/2} \quad (2)$$

where ch represents a channel index, $E_{post}(ch)$ represents energy/an amplitude of an audio signal of a channel with the channel index ch after stereo processing, $sampleCoef_{post}(ch, i)$ represents an $i^{th}$ coefficient of the current frame of the channel ch after stereo processing, N represents a quantity of coefficients of the current frame, and N is a positive integer greater than 1. The channel with the channel index ch may be any one of the foregoing P channels.

That is, the energy/amplitude sum of the current frame may be determined in the foregoing manner 1, and then the foregoing one bit allocation is completed by performing the following step 1022 and step 1023.

Manner 2: Determine the energy/amplitude sum of the current frame based on respective energy/amplitudes of the audio signals of the P channels before energy/amplitude equalization. The energy/amplitude sum may be an energy/amplitude sum $sum\_E_{pre}$ before energy/amplitude equalization.

For example, the energy/amplitude sum $sum\_E_{pre}$ before energy/amplitude equalization may be determined according to the following formula (3) and formula (4):

$$sum\_E_{pre} = \sum_{ch=1}^{P} E_{pre}(ch) \quad (3)$$

$$E_{pre}(ch) = \left(\sum_{i=1}^{N} sampleCoef(ch, i) \times sampleCoef(ch, i)\right)^{1/2} \quad (4)$$

where $E_{pre}(ch)$ represents energy/an amplitude of an audio signal of a channel with a channel index ch before energy/amplitude equalization, sampleCoef (ch, i) represents an $i^{th}$ coefficient of the current frame of the channel ch before energy/amplitude equalization, N represents a quantity of coefficients of the current frame, and N is a positive integer greater than 1.

That is, the energy/amplitude sum of the current frame may be determined in the foregoing manner 2, and then the foregoing one bit allocation is completed by performing the following step 1022 and step 1023.

Manner 3: Determine the energy/amplitude sum of the current frame based on respective energy/amplitudes of the audio signals of the P channels before energy/amplitude equalization and respective weighting coefficients of the P channels. A weighting coefficient of any one of the P channels is less than or equal to 1. The energy/amplitude sum may be an energy/amplitude sum $sum\_E_{pre}$ before energy/amplitude equalization.

For example, the energy/amplitude sum $sum\_E_{pre}$ before energy/amplitude equalization is determined according to the following formula (5):

$$sum\_E_{pre} = \sum_{ch=1}^{P} \alpha(ch) * E_{pre}(ch) \quad (5)$$

where α(ch) represents a weighting coefficient of a channel with a channel index ch, weighting coefficients of two channels in one channel pair are the same, and values of the weighting coefficients of the two channels in the one channel pair are inversely proportional to a normalized correlation value between the two channels in the channel pair.

In an embodiment, when the channel with the channel index ch does not participate in coupling, α(ch) is 1. When the channel with the channel index ch participates in coupling, a channel with a channel index ch1 (which is ch1 for short below), a channel with a channel index ch2 (which is ch2 for short below), a channel with a channel index ch3 (which is ch3 for short below), and a channel with a channel index ch4 (which is ch4 for short below) are used as an example, where the ch1 and the ch2 are coupled, the ch3 and the ch4 are coupled. In this case, α(ch1) and α(ch2) are equal and are both less than 1, and α(ch3) and α(ch4) are equal and are both less than 1. The α(ch1) and the α(ch2) may be determined based on a normalized correlation value Corr_norm (ch1, ch2) of the ch1 and the ch2. The α(ch3) and the α(ch4) may be determined based on a normalized correlation value Corr_norm(ch3, ch4). Values of the α(ch3) and the α(ch4) with a larger normalized correlation value Corr_norm(ch3, ch4) are less than values of the α(ch1) and the α(ch2) with a smaller normalized correlation value Corr_norm(ch1, ch2). In other words, the α(ch1) and the α(ch2) are inversely proportional to the normalized correlation value Corr_norm(ch1, ch2) of the ch1 and the ch2.

For example, when the ch1 and the ch2 are coupled, the α(ch1) and the α(ch2) may be calculated according to the following formula (6):

$$\alpha(ch1,ch2)=C+(1-C)\times(1-\mathrm{Corr\_norm}(ch1,ch2))/(1-\mathrm{threshold}) \quad (6)$$

where C represents a constant, C ∈ [0, 1], threshold represents a normalized coupling threshold of the ch1 and the ch2, threshold ∈ [0, 1], Corr_norm(ch1, ch2) represents a normalized correlation value of the ch1 and the ch2, and coeff(ch1, ch2) ∈ [0, 1]. In some embodiments, C may be 0.707, and threshold may be 0.2, 0.25, 0.28, or the like.

The correlation values of the two channels may be calculated according to the following formula (7). The ch1 and the ch2 are used as an example.

$$\mathrm{corr\_norm}(ch1, ch2) = \frac{\sum_{i=1}^{N} (\mathrm{spec\_ch1}(i) * \mathrm{spec\_ch2}(i))}{\sqrt{\sum_{i=1}^{N} (\mathrm{spe\_ch1}(i) * \mathrm{spec\_ch1}(i)) * \sum_{i=1}^{N} (\mathrm{spec\_ch2}(i) * \mathrm{spec\_ch2}(i))}} \quad (7)$$

where Corr_norm(ch1, ch2) represents the normalized correlation value of the ch1 and the ch2, spec_ch1(i) represents a time-domain or frequency-domain coefficient of the ch1, spec_ch2(i) represents a time-domain or frequency-domain coefficient of the ch2, and N represents a quantity of coefficients of the current frame.

For example, an L channel and an R channel are a first channel pair, a normalized correlation value of the L channel and the R channel is corr_norm(L, R), an LS channel and an RS channel are a second channel pair, and a normalized correlation value of the LS channel and the RS channel is corr_norm(LS, RS).

Correlation values of two channels of another channel pair may also be calculated according to formula (7), and weighting coefficients of the channels of the channel pair may also be calculated according to formula (6).

Stereo processing decreases an energy/amplitude sum of two channels participating in stereo processing; and a decrease value of the energy/amplitude sum of the two channels is related to a similarity between the audio signals of the two channels, that is, a higher correlation between the audio signals of the two channels indicates a larger decrease value of an energy/amplitude sum of the two channels after stereo processing.

Therefore, when energy/an amplitude before stereo processing is used in one bit allocation, a weighting coefficient is added during the one bit allocation. Weighting coefficients of two channels that are highly correlated are less than weighting coefficients of two channels that are lowly correlated. A weighting coefficient of an uncoupled channel is greater than a weighting coefficient of a coupled channel. Weighting coefficients of two channels in a same pair are the same. To be specific, an energy/amplitude sum may be determined in the foregoing manner 3, and then the foregoing one bit allocation is completed by performing the following step 1022 and step 1023.

Step 1022: Determine the respective bit coefficients of the K channel pairs based on respective energy/amplitudes of audio signals of the K channel pairs and the energy/amplitude sum of the current frame.

After the energy/amplitude sum is determined in the foregoing manner 1, manner 2, or manner 3, when P=2K, the respective bit coefficients of the K channel pairs may be determined based on the respective energy/amplitudes of the audio signals of the K channel pairs and the energy/amplitude sum determined in the foregoing step 1021.

After the energy/amplitude sum is determined in the foregoing manner 1, manner 2, or manner 3, when P=2×K+Q, the respective bit coefficients of the K channel pairs may be determined based on the respective energy/amplitudes of the audio signals of the K channel pairs and the energy/amplitude sum determined in the foregoing step 1021, and respective bit coefficients of Q channels are determined based on respective energy/amplitudes of the Q channels and the energy/amplitude sum determined in step 1021.

The respective bit coefficients of the K channel pairs may be proportions of respective energy/amplitudes of the K channel pairs in the energy/amplitude sum determined in the foregoing step 1021. Energy/an amplitude of a channel pair may be a sum of energy/amplitudes of two channels in the channel pair. The respective bit coefficients of the Q uncoupled channels are proportions of the respective energy/amplitudes of the Q channels in the energy/amplitude sum determined in the foregoing step 1021.

Step 1023: Determine the respective bit quantities of the K channel pairs based on the respective bit coefficients of the K channel pairs and the quantity of available bits.

When P=2K, the respective bit quantities of the K channel pairs may be determined based on the respective bit coefficients of the K channel pairs and the quantity of available bits.

When P=2×K+Q, the respective bit quantities of the K channel pairs may be determined based on the respective bit coefficients of the K channel pairs and the quantity of available bits, and the respective bit quantities of the Q channels may be determined based on the respective bit coefficients of the Q channels and the quantity of available bits.

In this embodiment, the audio signals of the P channels in the current frame of the multi-channel audio signal are obtained, where the audio signals of the P channels include the audio signals of the K channel pairs. The energy/amplitude sum of the current frame is determined based on the respective energy/amplitudes of the audio signals of the P channels. The respective bit coefficients of the K channel pairs are determined based on the respective energy/amplitudes of the audio signals of the K channel pairs and the energy/amplitude sum of the current frame. The respective bit quantities of the K channel pairs are determined based on the respective bit coefficients of the K channel pairs and the quantity of available bits. The audio signals of the P channels are encoded based on the respective bit quantities of the K channel pairs to obtain an encoded bitstream. The energy/amplitude sum of the current frame is determined based on at least one of: respective energy/amplitudes of the audio signals of the P channels in time domain, respective energy/amplitudes of the audio signals of the P channels after time-frequency transform, respective energy/amplitudes of the audio signals of the P channels after time-frequency transform and whitening, respective energy/amplitudes of the audio signals of the P channels after energy/amplitude equalization, or respective energy/amplitudes of the audio signals of the P channels after stereo processing. Bits are allocated to the channel pairs based on the proportions of the respective energy/amplitudes of the audio signals of the channel pairs in the energy/amplitude sum, to determine the respective bit quantities of the K channel pairs. In this way, the bit quantities of the channel pairs in multi-channel signal encoding are properly allocated, to ensure quality of an audio signal reconstructed by a decoder side. For example, when an energy/amplitude difference between channel pairs is relatively large, the method in this embodiment of this application can be used to resolve a problem that encoding bits of a channel pair with larger energy/a larger amplitude are insufficient, so as to ensure quality of an audio signal reconstructed by a decoder side.

In the following embodiment, signals of 5.1 channels are used as an example to describe an example of a multi-channel audio signal encoding method in an embodiment of this application.

Figure 5:
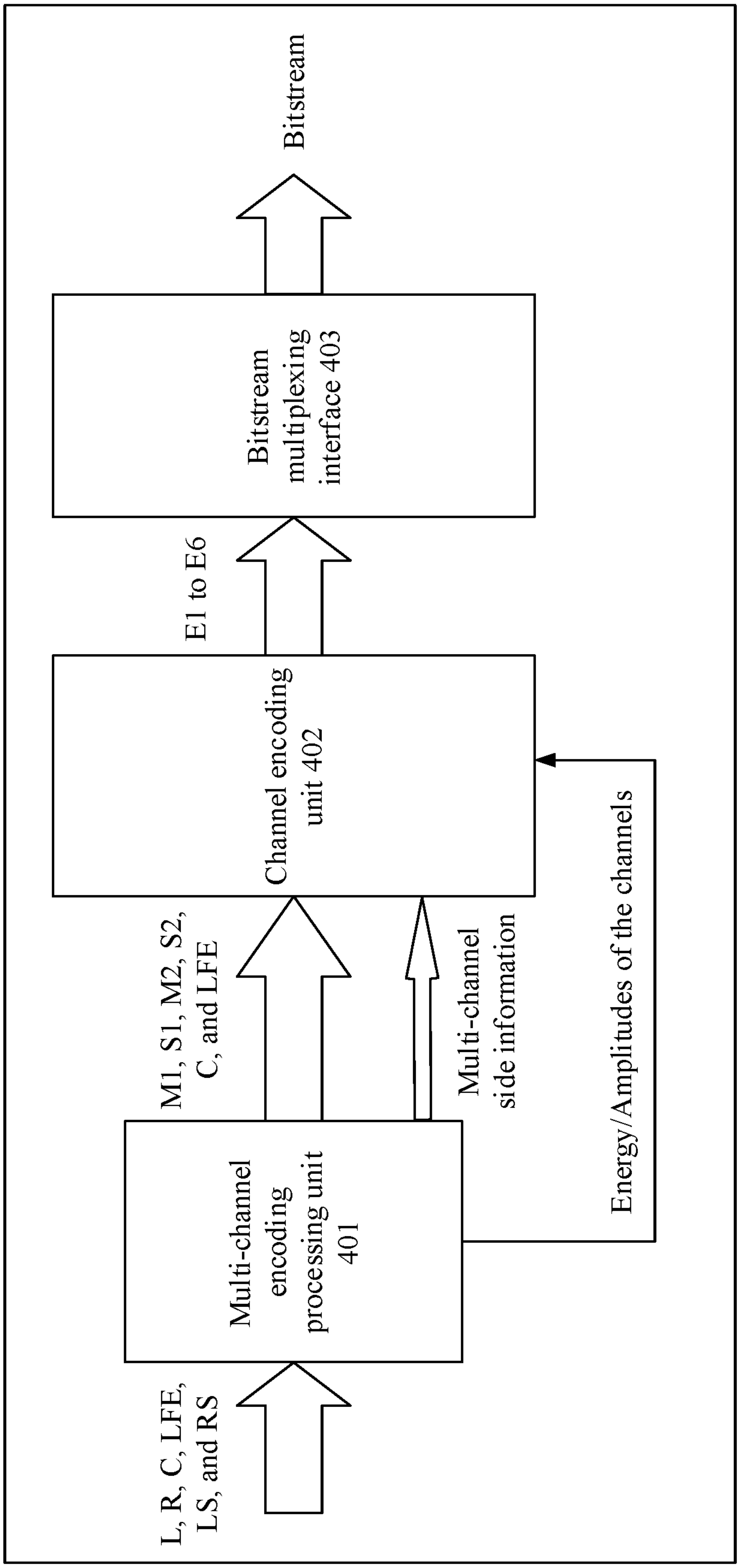
FIG. 5 is a schematic diagram of a processing procedure of an encoder side according to an embodiment of this application.

FIG. 5 is a schematic diagram of a processing procedure of an encoder side according to an embodiment of this application. As shown in FIG. 5, the encoder side may include a multi channel encoding processing unit 401, a channel encoding unit 402, and a bitstream multiplexing interface 403. The encoder side may be the foregoing encoder.

The multi-channel encoding processing unit 401 is configured to perform multi channel signal screening, coupling, stereo processing, and multi-channel side information generation on an input signal. In this embodiment, the input signal is signals of 5.1 channels (to be specific, an L channel, an R channel, a C channel, an LFE channel, an LS channel, and an RS channel).

For example, the multi-channel encoding processing unit 401 couples an L channel signal and an R channel signal to form a first channel pair, performs stereo processing on the first channel pair to obtain a middle channel M1 channel signal and a side channel S1 channel signal, and couples an LS channel signal and an RS channel signal to form a second channel pair, and performs stereo processing second channel pair to obtain a middle channel M2 channel signal and a side channel S2 channel signal.

Because of a relatively large energy/amplitude difference between plurality of channels, before stereo processing is performed, energy/amplitude equalization is performed on the plurality of channels to increase a stereo processing gain, that is, concentrate energy/amplitudes on the middle channel, to help the channel encoding unit improve encoding efficiency. In this embodiment of this application, equalization is performed on coupled channels to obtain an inter-channel energy/amplitude tradeoff. It is assumed that energy/amplitudes of current frames of input channels before energy/amplitude equalization is/are energy_L, energy_R, energy_C, energy_LS, and energy_RS. energy_L represents energy/an amplitude of the L channel signal before energy/amplitude equalization, energy_R represents energy/an amplitude of the R channel signal before energy/amplitude equalization, energy_C represents energy/an amplitude of the C channel signal before energy/amplitude equalization, energy_LS represents energy/an amplitude of the LS channel signal before energy/amplitude equalization, and energy_RS represents energy/an amplitude of the RS channel signal before energy/amplitude equalization.

Energy/an amplitude of each of the L channel and the R channel in the first channel pair after energy/amplitude equalization is energy_avg_LR, and energy_avg_LR may be calculated according to the following formula (8):

$$\text{energy\_avg\_}LR=\text{avg}(\text{energy\_}L,\text{energy\_}R) \quad (8)$$

Energy/an amplitude of each of the LS channel and the RS channel in the second channel pair after energy/amplitude equalization is energy_avg_LSRS, and the energy_avg_LSRS may be calculated according to the following formula (9):

$$\text{energy\_avg\_LSRS}=\text{avg}(\text{energy\_}LS,\text{energy\_}RS) \quad (9)$$

where an avg(a1, a2) function implements an average value of two input parameters a1 and a2. a1 is set to energy_L, and a2 is set to energy_R. a1 is set to energy_LS, and a2 is set to energy_RS.

A calculation formula for calculating energy/amplitudes energy(ch) (including energy_L, energy_R, energy_C, energy_LS, and energy_RS) of the channels before energy/amplitude equalization is as follows:

$$\text{energy\_ch} = \left(\sum_{i=1}^{N} sampleCoef(ch,i) \times sampleCoef(ch,i)\right)^{1/2} \quad (10)$$

where sampleCoef(ch,i) represents an $i^{th}$ coefficient of a current frame of a channel with a channel index ch; N represents a quantity of coefficients of the current frame; and different values of ch may correspond to the L channel, the R channel, the C channel, the LFE channel, the LS channel, and the RS channel.

In this embodiment of this application, energy_L is equal to $E_{pre}$(L), energy_R is equal to $E_{pre}$(R), energy_LS is equal to $E_{pre}$(LS), energy_RS is equal to $E_{pre}$(RS), and energy_C is equal to $E_{pre}$(C). $E_{post}$(L)=$E_{post}$(R)=energy_avg_LR. $E_{post}$(LS)=$E_{post}$(RS)=energy_avg_LSRS.

The multi-channel encoding processing unit 401 outputs the M1 channel signal, the S1 channel signal, the M2 channel signal, and the S2 channel signal on which stereo processing is performed, and the LFE channel signal and the C channel signal on which stereo processing is not performed, and multi-channel side information.

The channel encoding unit 402 is configured to encode the M1 channel signal, the S1 channel signal, the M2 channel signal, and the S2 channel signal on which stereo processing is performed, and the LFE channel signal and the C channel signal on which stereo processing is not performed, and the multi-channel side information, to output encoded channels E1 to E6. The channel encoding unit 402 may include a plurality of processing boxes, and the processing box allocates more bits to a channel with larger energy/a larger amplitude than a channel with smaller energy/a smaller amplitude. The channel encoding unit 402 performs quantization and entropy encoding to remove a redundancy from the encoder side, and then sends the encoded channels E1 to E6 to the bitstream multiplexing interface 403.

The bitstream multiplexing interface 403 multiplexes the six encoded channels E1 to E6 to form a serial bitstream, so as to facilitate transmission of a multi-channel audio signal in a channel or storage of a multi-channel audio signal in a digital medium.

Figure 6:
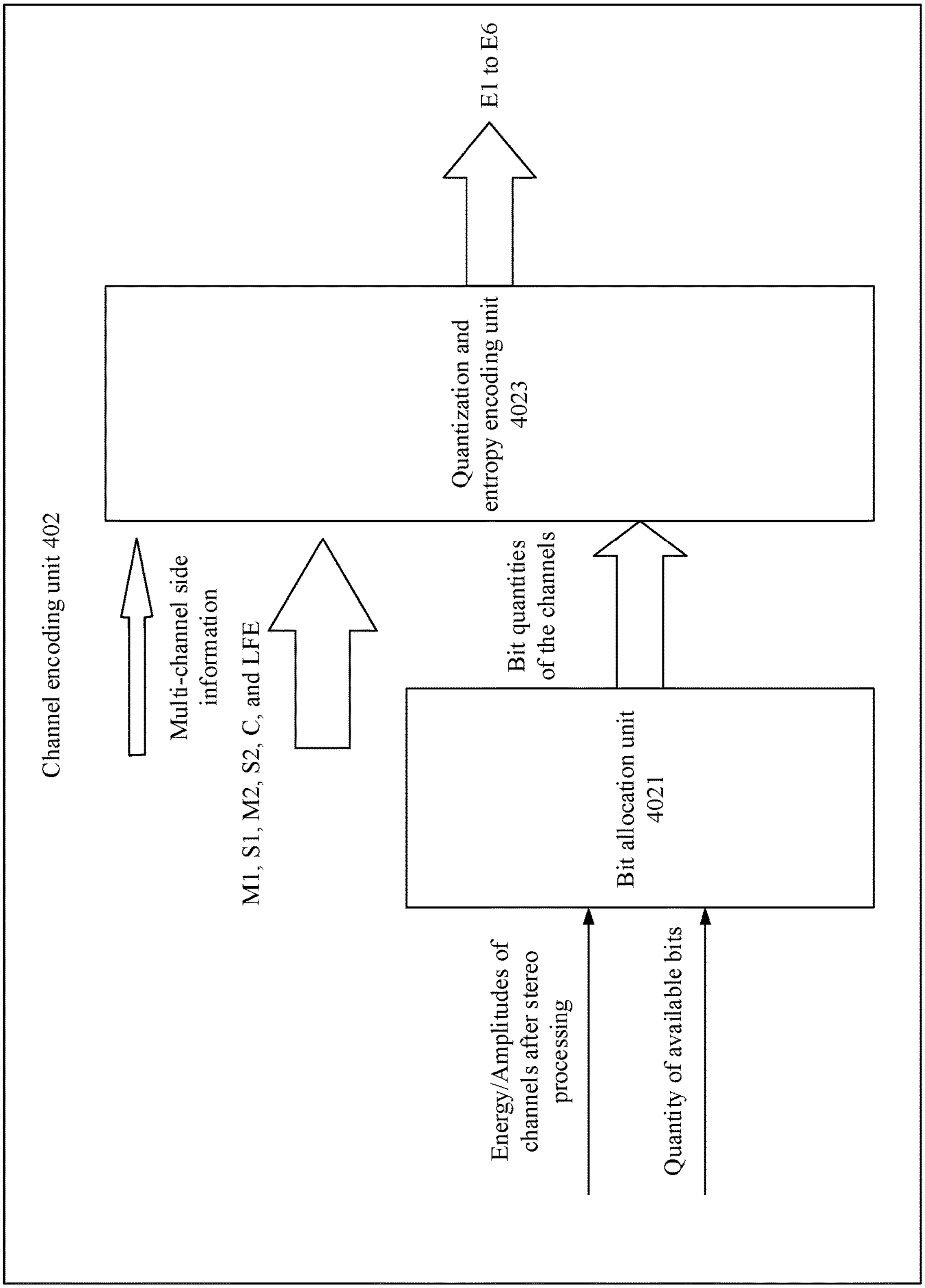
FIG. 6 is a schematic diagram of a processing procedure of a channel encoding unit according to an embodiment of this application.

FIG. 6 is a schematic diagram of a processing procedure of a channel encoding unit according to an embodiment of this application. As shown in FIG. 6, the channel encoding unit 402 may include a bit allocation unit 4021 and a quantization and entropy encoding unit 4023. This embodiment is described by using the foregoing manner 1 as an example.

The bit allocation unit 4021 is configured to perform the one bit allocation and the two bit allocations in the foregoing embodiment, to obtain the bit quantities of the channels.

For example, the bit allocation unit 4021 determines an energy/amplitude sum sum_$E_{post}$ after stereo processing according to the foregoing formula (1) and formula (2). Then, the bit coefficients of the channel pairs and the bit coefficients of the uncoupled channels are determined according to the following formula (11) to formula (14). In this embodiment, a bit coefficient of a first channel pair is represented by Ratio(L, R), a bit coefficient of a second channel pair is represented by Ratio(LS, RS), a bit coefficient of an uncoupled C channel is represented by Ratio(C), and a bit coefficient of an uncoupled LFE channel is represented by Ratio(LFE):

$$\text{Ratio}(L,R) = (E_{post}(M1) + E_{post}(S1))/\text{sum\_E}_{post} \quad (11)$$

$$\text{Ratio}(LS,RS) = (E_{post}(M2) + E_{post}(S2))/\text{sum\_E}_{post} \quad (12)$$

$$\text{Ratio(C)} = E_{post}(C)/\text{sum\_E}_{post} \quad (13)$$

$$\text{Ratio(LFE)} = E_{post}(LFE)/\text{sum\_E}_{post} \quad (14)$$

The bit allocation unit obtains the bit quantities of the channels through calculation based on Ratio(L, R), Ratio (LS, RS), Ratio(C), Ratio (LFE), the quantity of available bits bAvail, channel pair indexes pairIdx1 and pairIdx2, and the energy/amplitudes $E_{post}$ (ch) of the channels after stereo processing. The channel pair indexes pairIdx1 and pairIdx2 may be output by the multi channel encoding processing unit 401. The channel pair index pairIdx1 is used to indicate that the L channel and the R channel are coupled, and the channel pair index pairIdx2 is used to indicate that the LS channel and the RS channel group are coupled.

For example, the bit quantities of the channels may be determined according to the following formula (15) to formula (22).

For bit allocations of the channel pairs, $$\mathrm{Bits}(M1, S1) = bAvail \times \mathrm{Ratio}(L, R) \quad (15)$$

$$\mathrm{Bits}(M2, S2) = bAvail \times \mathrm{Ratio}(LS, RS) \quad (16)$$

where Bits(M1, S1) represents a bit quantity of the first channel pair, and Bits(M2, S2) represents a bit quantity of the second channel pair.

For bit allocation between channels within a channel pair and bit allocation for channels that do not participate in a coupling, a bit allocation between channels in coupled channels is as follows:

$$\mathrm{Bits}(M1) = \mathrm{Bits}(M1, S1) \times E_{post}(M1)/(E_{post}(M1) + E_{post}(S1)) \quad (17)$$

$$\mathrm{Bits}(S1) = \mathrm{Bits}(M1, S1) \times E_{post}(S1)/(E_{post}(M1) + E_{post}(S1)) \quad (18)$$

$$\mathrm{Bits}(M2) = \mathrm{Bits}(M2, S2) \times E_{post}(M2)/(E_{post}(M2) + E_{post}(S2)) \quad (19)$$

$$\mathrm{Bits}(S2) = \mathrm{Bits}(M2, S2) \times E_{post}(S2)/(E_{post}(M2) + E_{post}(S2)) \quad (20)$$

where Bits(M1) represents a bit quantity of the M1 channel, Bits(S1) represents a bit quantity of the S1 channel, Bits (M2) represents a bit quantity of the M2 channel, and Bits(S2) represents a bit quantity of the S2 channel.

A bit allocation for the channels that do not participate in coupling is as follows:

$$\mathrm{Bits}(C) = bAvail \times \mathrm{Ratio}(C) \quad (21)$$

$$\mathrm{Bits}(LFE) = bAvail \times \mathrm{Ratio}(LFE) \quad (22)$$

where Bits(C) represents a bit quantity of the C channel, and Bits(LFE) represents a bit quantity of the LFE channel.

The quantization and entropy encoding unit 4023 performs, based on the bit quantities of the channels, quantization and entropy encoding on the M1 channel signal, the S1 channel signal, the M2 channel signal, and the S2 channel signal on which stereo processing is performed, the C channel signal, the LFE channel signal, and multi-channel side information, to obtain an encoded channel E1 signal to an encoded channel E6 signal.

In this embodiment, energy/amplitude equalization is performed on two channels of a channel pair by using the channel pair as a granularity. Because of different energy/amplitude proportions of the channel pairs before stereo processing, energy/amplitude proportions of the channel pairs after stereo processing are also different; then, a bit allocation between the channel pairs is performed based on the energy/amplitude proportions of the channel pairs after stereo processing; and finally, bits are allocated within the channel pairs. In this way, bit quantities of the channels in multi-channel signal encoding can be properly allocated, to ensure quality of an audio signal reconstructed by a decoder side. For example, when an energy/amplitude difference between channel pairs is relatively large, the method in this embodiment of this application can be used to resolve a problem that encoding bits of signals of a channel pair with larger energy/a larger amplitude are insufficient, so as to ensure quality of an audio signal reconstructed by a decoder side.

In addition to the example embodiment of the energy/amplitude equalization of the multi-channel encoding processing unit 401 in the embodiment shown in FIG. 5, this embodiment of this application further provides another energy/amplitude equalization manner. The foregoing signals of the 5.1 channels are used as an example for further description.

Energy/an amplitude of each channel after energy/amplitude equalization is energy_avg. A value of energy_avg can be determined according to the following formula (23):

$$\mathrm{energy\_avg} = \mathrm{avg}(\mathrm{energy\_}L, \mathrm{energy\_}R, \mathrm{energy\_}C, \mathrm{energy\_}LS, \mathrm{energy\_}RS) \quad (23)$$

where an Avg(a1, a2, . . . , an) function implements an average value of n input parameters a1, a2, . . . , and an.

Figure 7:
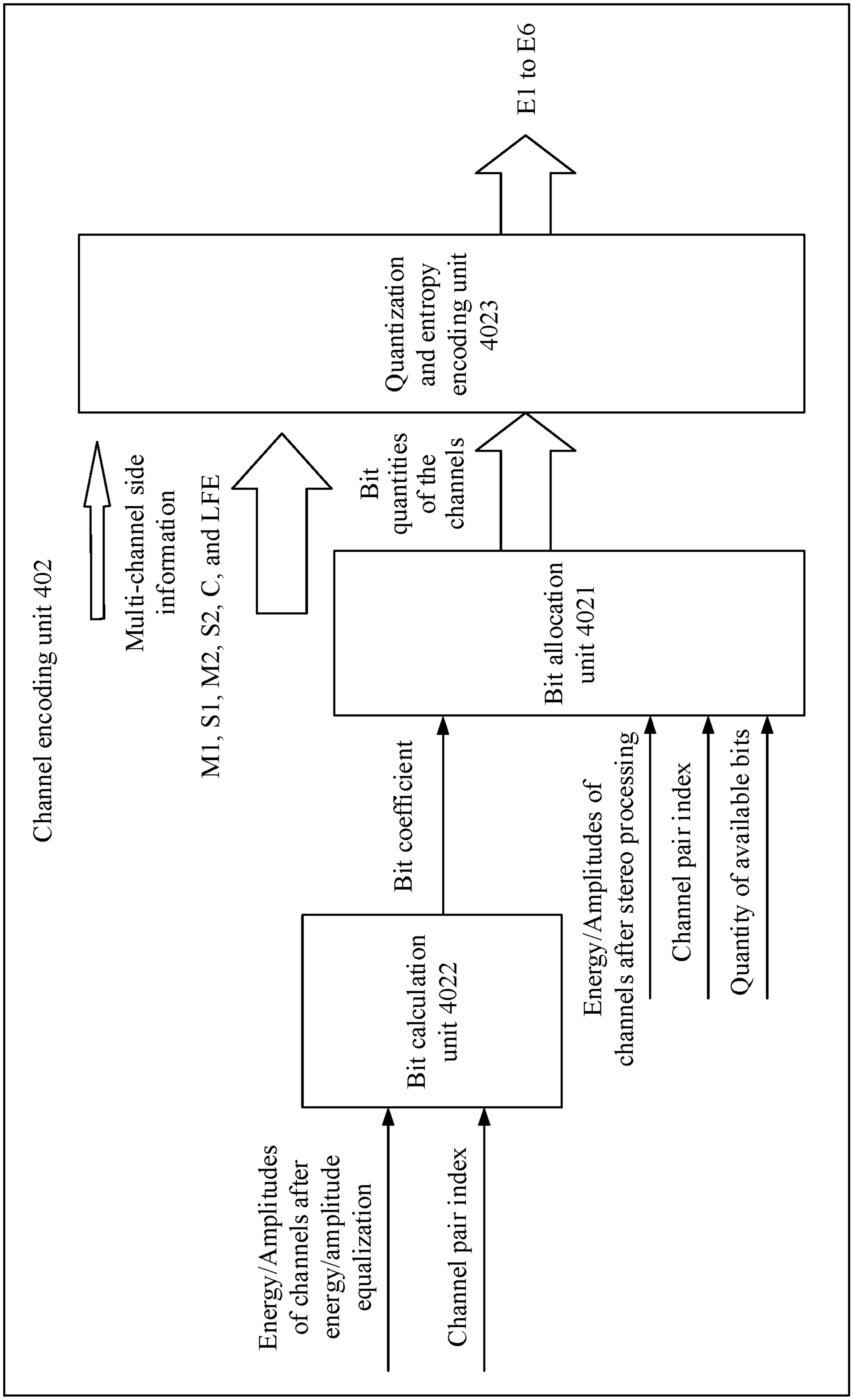
FIG. 7 is a schematic diagram of a processing procedure of a channel encoding unit according to an embodiment of this application.

FIG. 7 is a schematic diagram of a processing procedure of a channel encoding unit according to an embodiment of this application. As shown in FIG. 7, the channel encoding unit 402 may include a bit allocation unit 4021, a quantization and entropy encoding unit 4023, and a bit calculation unit 4022. This embodiment is described by using the foregoing manner 2 as an example.

The bit allocation unit 4021 is configured to perform the one bit allocation and the two bit allocations in the foregoing embodiment, to obtain the bit quantities of the channels.

For example, the bit calculation unit 4022 determines, according to the foregoing formula (3) and formula (4), an energy/amplitude sum sum_$E_{pre}$ before energy/amplitude equalization. Then, the bit coefficients of the channel pairs and the bit coefficients of the uncoupled channels are determined according to the following formula (24) to formula (27). In this embodiment, a bit coefficient of a first channel pair is represented by Ratio(L, R), a bit coefficient of a second channel pair is represented by Ratio(LS, RS), a bit coefficient of an uncoupled C channel is represented by Ratio(C), and a bit coefficient of an uncoupled LFE channel is represented by Ratio(LFE):

$$\mathrm{Ratio}(L, R) = (E_{pre}(L) + E_{pre}(R))/\mathrm{sum\_E}_{pre} \quad (24)$$

$$\mathrm{Ratio}(LS, RS) = (E_{pre}(LS) + E_{pre}(RS))/\mathrm{sum\_E}_{pre} \quad (25)$$

$$\mathrm{Ratio}(C) = E_{pre}(C)/\mathrm{sum\_E}_{pre} \quad (26)$$

$$\mathrm{Ratio}(LFE) = E_{pre}(LFE)/\mathrm{sum\_E}_{pre} \quad (27)$$

The bit allocation unit 4021 obtains the bit quantities of the channels through calculation based on Ratio(L, R), Ratio(LS, RS), Ratio(C), Ratio (LFE), the quantity of available bits bAvail, channel pair indexes pairIdx1 and pairIdx2, and the energy/amplitudes $E_{post}$ (ch) of the channels after stereo processing. The channel pair indexes pairIdx1 and pairIdx2 may be output by the multi-channel encoding processing unit 401. The channel pair index pairIdx1 is used to indicate that the L channel and the R channel are coupled, and the channel pair index pairIdx2 is used to indicate that the LS channel and the RS channel group are coupled.

For example, the bit quantities of the channels may be determined based on the bit quantities determined in the foregoing formula (24) to formula (27) and according to the foregoing formula (15) to formula (22).

The quantization and entropy encoding unit 4023 performs, based on the bit quantities of the channels, quantization and entropy encoding on the M1 channel signal, the S1 channel signal, the M2 channel signal, and the S2 channel signal on which stereo processing is performed, the C channel signal, the LFE channel signal, and multi-channel side information, to obtain an encoded channel E1 signal to an encoded channel E6 signal.

In this embodiment, stereo processing is performed after energy/amplitude equalization is performed on all channels. Although energy/amplitude proportions of the channels are similar after stereo processing, in this embodiment of this application, after stereo processing, a bit allocation between the channel pairs is performed based on energy/amplitude proportions of the channel pairs before stereo processing, and then bits within the channel pairs are allocated based on the energy/amplitude after stereo processing. A bit allocation between the channel pairs is guided based on the energy/amplitude proportions of the channel pairs before stereo processing. Because of different energy/amplitude proportions of the channel pairs before stereo processing, a bit allocation between the channel pairs is performed based on the different energy/amplitude proportions. In this way, the bit quantities of the channels in multi-channel signal encoding can be properly allocated, to ensure quality of an audio signal reconstructed by a decoder side. For example, when an energy/amplitude difference between channel pairs is relatively large, the method in this embodiment of this application can be used to resolve a problem that encoding bits of signals of a channel pair with larger energy/a larger amplitude are insufficient, so as to ensure quality of an audio signal reconstructed by a decoder side.

In some embodiments, the channel encoding unit 402 may include a bit allocation unit 4021, a quantization and entropy encoding unit 4023, and a bit calculation unit 4022, and may be further configured to implement functions of the steps in manner 3.

The bit allocation unit 4021 is configured to perform the one bit allocation and the two bit allocations in the foregoing embodiment, to obtain the bit quantities of the channels.

For example, the bit allocation unit 4021 determines an energy/amplitude sum $sum\_E_{pre}$ before energy/amplitude equalization by using the foregoing formula (5) to formula (7). Then, the bit coefficients of the channel pairs and the bit coefficients of the uncoupled channels are determined according to the following formula (28) to formula (31). In this embodiment, a bit coefficient of a first channel pair is represented by Ratio(L, R), a bit coefficient of a second channel pair is represented by Ratio(LS, RS), a bit coefficient of an uncoupled C channel is represented by Ratio(C), and a bit coefficient of an uncoupled LFE channel is represented by Ratio(LFE):

$$\mathrm{Ratio}(L, R) = (\alpha(L) * E_{pre}(L) + \alpha(R) * E_{pre}(R))/\mathrm{sum\_E}_{pre} \tag{28}$$

$$\mathrm{Ratio}(LS, RS) = (\alpha(LS) * E_{pre}(LS) + \alpha(RS) * E_{pre}(RS))/\mathrm{sum\_E}_{pre} \tag{29}$$

$$\mathrm{Ratio}(C) = \alpha(C) * E_{pre}(C)/\mathrm{sum\_E}_{pre} \tag{30}$$

$$\mathrm{Ratio}(LFE) = \alpha(LFE) * E_{pre}(LFE)/\mathrm{sum\_E}_{pre} \tag{31}$$

where α(L) represents a weighting coefficient of the L channel, α(R) represents a weighting coefficient of the R channel, α(LS) represents a weighting coefficient of the LS channel, α(RS) represents a weighting coefficient of the RS channel, α(C) represents a weighting coefficient of the C channel, and α(LFE) represents a weighting coefficient of the LFE channel.

For example, the bit quantities of the channels may be determined based on the bit quantities determined in the foregoing formula (28) to formula (31) and according to the foregoing formula (15) to formula (22).

The quantization and entropy encoding unit performs, based on the bit quantities of the channels, quantization and entropy encoding on the M1 channel signal, the S1 channel signal, the M2 channel signal, and the S2 channel signal on which stereo processing is performed, the C channel signal, the LFE channel signal, and multi-channel side information, to obtain an encoded channel E1 signal to an encoded channel E6 signal.

In this embodiment, a bit allocation is adjusted based on a weighting coefficient. In this way, bit quantities of channels in multi-channel signal encoding can be properly allocated, to ensure quality of an audio signal reconstructed by a decoder side.

Figure 8:
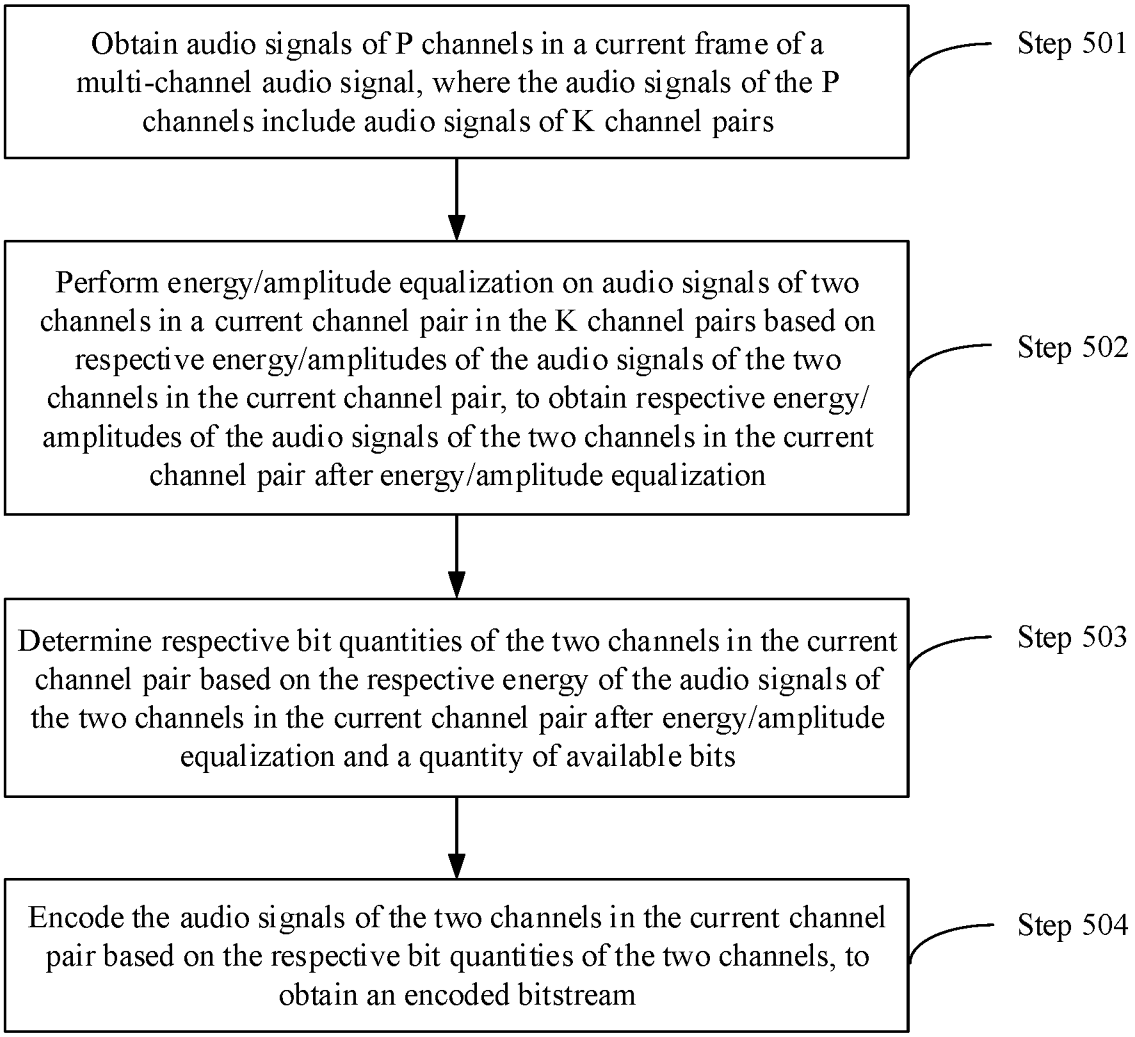
FIG. 8 is a flowchart of another multi-channel audio signal encoding method according to an embodiment of this application.

FIG. 8 is a flowchart of another multi-channel audio signal encoding method according to an embodiment of this application. This embodiment of this application may be executed by the foregoing encoder. As shown in FIG. 8, the method in this embodiment may include the following steps.

Step 501: Obtain audio signals of P channels in a current frame of a multi-channel audio signal, where P is a positive integer greater than 1, and the audio signals of the P channels include audio signals of K channel pairs.

Audio signals of one channel pair include audio signals of two channels.

The one channel pair in this embodiment of this application may be any one of the K channel pairs. Audio signals of two coupled (coupling) channels are audio signals of one channel pair.

In some embodiments, P=2K. After multi-channel signal screening, coupling, stereo processing, and multi-channel side information generation, the audio signals of the P channels, that is, the audio signals of the K channel pairs, may be obtained.

In some embodiments, the audio signals of the P channels further include audio signals of Q uncoupled channels, where P=2×K+Q, K is a positive integer, and Q is a positive integer.

For an example description of step 501, refer to step 101 in the embodiment shown in FIG. 2. Details are not described herein again.

Step 502: Perform energy/amplitude equalization on audio signals of two channels in a current channel pair in the K channel pairs based on respective energy/amplitudes of the audio signals of the two channels in the current channel pair, to obtain respective energy/amplitudes of the audio signals of the two channels in the current channel pair after energy/amplitude equalization.

In this embodiment of this application, energy/amplitude equalization is performed for the channel pair, that is, energy/amplitude equalization within the channel pairs is performed for the channel pairs. The current channel pair in the K channel pairs is used as an example. Energy/amplitude equalization is performed on the audio signals of the two channels in the current channel pair in the K channel pairs based on the respective energy/amplitudes of the audio signals of the two channels in the current channel pair, to obtain the respective energy/amplitudes of the two channels in the current channel pair after energy/amplitude equalization.

Regardless of when P=2K or when P=2×K+Q, energy/amplitude equalization may be performed within the channel pairs in the manner in step 502, to obtain respective energy/amplitudes of the two channels in the current channel pair after energy/amplitude equalization.

For example, the energy/amplitudes of the two channels in the current channel pair after energy/amplitude equalization may be determined according to the foregoing formula (8). To be specific, L and R in formula (8) are replaced by the two channels in the current channel pair.

Step 503: Determine respective bit quantities of the two channels in the current channel pair based on the respective energy/amplitudes of the audio signals of the two channels in the current channel pair after energy/amplitude equalization and a quantity of available bits.

The current channel pair in the K channel pairs is used as an example. The respective bit quantities of the two channels in the current channel pair are determined based on the respective energy/amplitudes of the two channels in the current channel pair after energy/amplitude equalization and the quantity of available bits. The current channel pair may be any one of the K channel pairs.

When P=2×K, in the method in this embodiment of this application, an energy/amplitude sum of the current frame may be determined based on energy/amplitudes of audio signals of two channels in each of the K channel pairs after energy/amplitude equalization. The respective bit quantities of the two channels in the current channel pair are determined based on the energy/amplitude sum of the current frame, the respective energy/amplitudes of the audio signals of the two channels in the current channel pair after energy/amplitude equalization, and the quantity of available bits.

For example, the respective bit quantities of the two channels in the current channel pair are determined based on proportions of the respective energy/amplitudes of the audio signals of the two channels in the current channel pair after energy/amplitude equalization in the energy/amplitude sum, and the quantity of available bits.

When P=2×K+Q, in the method in this embodiment of this application, an energy/amplitude sum of the current frame may be determined based on energy/amplitudes of audio signals of two channels of each of the K channel pairs after energy/amplitude equalization and energy/amplitudes of audio signals of Q channels after energy/amplitude equalization. The respective bit quantities of the two channels in the current channel pair are determined based on the energy/amplitude sum, the respective energy/amplitudes of the audio signals of the two channels in the current channel pair, and the quantity of available bits. Respective bit quantities of the Q channels are determined based on the energy/amplitude sum, the respective energy/amplitudes of the audio signals of the Q channels after energy/amplitude equalization, and the quantity of available bits.

For example, the bit quantities of the two channels in the current channel pair are determined based on proportions of the respective energy/amplitudes of the audio signals of the two channels in the current channel pair in the energy/amplitude sum, and the quantity of available bits. The respective bit quantities of the Q channels are determined based on proportions of the respective energy/amplitudes of the audio signals of the Q channels after energy/amplitude equalization in the energy/amplitude sum, and the quantity of available bits.

The respective energy/amplitudes of the audio signals of the Q channels after energy/amplitude equalization may be equal to respective energy/amplitudes of the audio signals of the Q channels before energy/amplitude equalization, and is approximately equal to respective energy/amplitudes of the audio signals of the Q channels after stereo processing. The energy/amplitudes of the audio signals of the two channels of each of the K channel pairs after energy/amplitude equalization may be approximately equal to energy/amplitudes of the audio signals of the two channels of each of the K channel pairs after stereo processing.

For example, the energy/amplitude sum may be determined according to the foregoing formula (1), to be specific, the energy/amplitude after stereo processing in formula (1) is replaced by the energy/amplitude of each channel after energy/amplitude equalization in this embodiment.

Step 504: Encode the audio signals of the two channels in the current channel pair based on the respective bit quantities of the two channels, to obtain an encoded bitstream.

The encoding the audio signals of the two channels in the current channel pair may include: separately performing quantization, entropy encoding, and bitstream multiplexing on the audio signals of the two channels in the current channel pair, to obtain the encoded bitstream.

When P=2K, quantization, entropy encoding, and bitstream multiplexing are separately performed on the audio signals of the P channels based on the respective bit quantities of the K channel pairs, to obtain the encoded bitstream.

When P=2×K+Q, quantization, entropy encoding, and bitstream multiplexing are separately performed on audio signals of the K channel pairs based on the respective bit quantities of the K channel pairs; and quantization, entropy encoding, and bitstream multiplexing are separately performed on audio signals of the Q channels based on the respective bit quantities of the Q channels, to obtain the encoded bitstream.

In this embodiment, the audio signals of the P channels in the current frame of the multi-channel audio signal are obtained, where the audio signals of the P channels include the audio signals of the K channel pairs. Energy/amplitude equalization is performed on the audio signals of the two channels in the current channel pair in the K channel pairs based on the respective energy/amplitudes of the audio signals of the two channels in the current channel pair, to obtain the energy/amplitudes of the two channels in the current channel pair after energy/amplitude equalization. The respective bit quantities of the two channels in the current channel pair are determined based on the respective energy/amplitudes of the two channels in the current channel pair after energy/amplitude equalization and the quantity of available bits. The audio signals of the two channels in the current channel pair are encoded based on the respective bit quantities of the two channels, to obtain the encoded bitstream. Through energy/amplitude equalization within the channel pairs, bits are allocated based on energy/amplitude after energy/amplitude equalization. In this way, bit quantities of channels in multi-channel signal encoding are properly allocated, to ensure quality of an audio signal reconstructed by a decoder side. For example, when an energy/amplitude difference between channel pairs is relatively large, the method in this embodiment of this application can be used to resolve a problem that encoding bits of signals of a channel pair with larger energy/a larger amplitude are insufficient, so as to ensure quality of an audio signal reconstructed by a decoder side.

The embodiments shown in FIG. 5 and FIG. 6 are used as examples to describe the embodiment shown in FIG. 8.

The multi-channel encoding processing unit 401 in the embodiment shown in FIG. 5 may perform step 501 and step 502 in the embodiment shown in FIG. 8, and the channel encoding unit 402 may perform step 503 in the embodiment shown in FIG. 8. When the channel encoding unit 402 can perform step 503 in the embodiment shown in FIG. 8, a difference from the embodiments shown in FIG. 5 and FIG. 6 lies in that the bit allocation unit 4021 can determine the bit quantities of the channels in the following manner.

The bit allocation unit 4021 in this embodiment of this application can perform bit allocation based on respective energy/amplitudes of the P channels after energy/amplitude equalization. Specifically, the bit quantities of the channels may be determined by using the following formula (32) to formula (37):

$$\mathrm{Bits}(M1) = bAvail \times E_{post}(M1)/\mathrm{sum\_E}_{post} \quad (32)$$

$$\mathrm{Bits}(S1) = bAvail \times E_{post}(S1)/\mathrm{sum\_E}_{post} \quad (33)$$

$$\mathrm{Bits}(M2) = bAvail \times E_{post}(M2)/\mathrm{sum\_E}_{post} \quad (34)$$

$$\mathrm{Bits}(S2) = bAvail \times E_{post}(S2)/\mathrm{sum\_E}_{post} \quad (35)$$

$$\mathrm{Bits}(C) = bAvail \times E_{post}(C)/\mathrm{sum\_E}_{post} \quad (36)$$

$$\mathrm{Bits}(LFE) = bAvail \times E_{post}(LFE)/\mathrm{sum\_E}_{post} \quad (37)$$

When bits are allocated according to formula (32) to formula (37), the multi-channel encoding processing unit 401 needs to use an energy/amplitude equalization manner of the channel pairs, that is, energy/amplitude equalization within the channel pairs. $\mathrm{sum\_E}_{post}$ may be determined according to the foregoing formula (1).

An energy/amplitude sum of the L channel and the R channel before energy/amplitude equalization is E(L, R). After energy/amplitude equalization, the energy/amplitude sum of the L channel and the R channel does not change, and is still E(L, R). After stereo processing is performed on the L channel and the R channel, an energy/amplitude sum of the L channel and the R channel after stereo processing changes to $E_{post}$(M1, S1). This is because stereo processing slightly decreases a redundancy between the L channel and the R channel and satisfies $E_{post}(M1, S1) \approx E(L, R)$. In other words, when the energy/amplitude sum of the L channel and the R channel and E(L, R)>>(far greater than) an energy/amplitude sum of the LS channel and the RS channel E(LS, RS), through processing by the multi-channel encoding processing unit 401 in this embodiment of this application and the bit allocation unit 4021 in this embodiment, Bits (M1)+Bits(S1) allocated based on E(L, R) may be far greater than Bits(M2)+Bits(S2). In this way, bits are allocated between channel pairs based on energy/an amplitude.

$$\begin{aligned}\mathrm{Bits}(M1) + \mathrm{Bits}(S1) &= bAvail \times E_{post}(M1)/\mathrm{sum\_E}_{post} + bAvail \times E_{post}(S1)/\mathrm{sum\_E}_{post} \\ &= bAvail \times E_{post}(M1, S1)/\mathrm{sum\_E}_{post} \\ &>> bAvail \times E_{post}(M2, S2)/\mathrm{sum\_E}_{post} \\ &= \mathrm{Bits}(M2) + \mathrm{Bits}(S2)\end{aligned}$$

In this embodiment, through energy/amplitude equalization within the channel pair, bits are allocated based on energy/amplitudes after energy/amplitude equalization. In this way, bit quantities of the channels in multi-channel signal encoding are properly allocated, to ensure quality of an audio signal reconstructed by a decoder side. For example, when an energy/amplitude difference between channel pairs is relatively large, the method in this embodiment of this application can be used to resolve a problem that encoding bits of signals of a channel pair with larger energy/a larger amplitude are insufficient, so as to ensure quality of an audio signal reconstructed by a decoder side.

Based on a same inventive concept as the foregoing method, an embodiment of this application further provides an audio signal encoding apparatus. The audio signal encoding apparatus may be used in an audio encoder.

Figure 9:
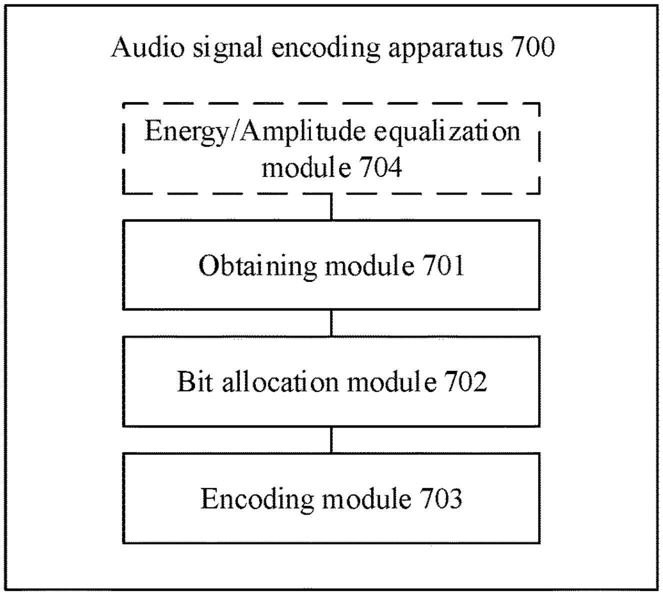
FIG. 9 is a schematic structural diagram of an audio signal encoding apparatus according to an embodiment of this application.

FIG. 9 is a schematic structural diagram of an audio signal encoding apparatus according to an embodiment of this application. As shown in FIG. 9, the audio signal encoding apparatus 700 includes an obtaining module 701, a bit allocation module 702, and an encoding module 703.

The obtaining module 701 is configured to obtain audio signals of P channels in a current frame of a multi-channel audio signal and respective energy/amplitudes of the audio signals of the P channels, where P is a positive integer greater than 1, the audio signals of the P channels include audio signals of K channel pairs, and K is a positive integer.

The bit allocation module 702 is configured to determine respective bit quantities of the K channel pairs based on the respective energy/amplitudes of the audio signals of the P channels and a quantity of available bits.

The encoding module 703 is configured to encode the audio signals of the P channels based on the respective bit quantities of the K channel pairs to obtain an encoded bitstream.

Energy/an amplitude of an audio signal of one of the P channels includes at least one of: energy/an amplitude of the audio signal of the one channel in time domain, energy/an amplitude of the audio signal of the one channel after time-frequency transform, energy/an amplitude of the audio signal of the one channel after time-frequency transform and whitening, energy/an amplitude of the audio signal of the one channel after energy/amplitude equalization, or energy/an amplitude of the audio signal of the one channel after stereo processing.

In some embodiments, the encoding module 703 is configured to: determine respective bit quantities of two channels in the current channel pair in the K channel pairs based on the bit quantity of the current channel pair and respective energy/amplitudes of audio signals of the two channels in the current channel pair after stereo processing; and encode the audio signals of the two channels based on the respective bit quantities of the two channels in the current channel pair.

In some embodiments, the bit allocation module 702 is configured to determine an energy/amplitude sum of the current frame based on the respective energy/amplitudes of the audio signals of the P channels; determine respective bit coefficients of the K channel pairs based on the respective energy/amplitudes of the audio signals of the K channel pairs and the energy/amplitude sum of the current frame; and determine the respective bit quantities of the K channel pairs based on the respective bit coefficients of the K channel pairs and the quantity of available bits.

In some embodiments, the bit allocation module 702 is configured to: determine the energy/amplitude sum of the current frame based on respective energy/amplitudes of the audio signals of the P channels after stereo processing.

In some embodiments, the bit allocation module 702 is configured to:

calculate the energy/amplitude sum $\mathrm{sum\_E}_{post}$ of the current frame according to a formula $$\mathrm{sum\_E}_{post} = \sum\nolimits_{ch=1}^{P} E_{post}(ch),$$

where $$E_{post}(ch) = \left(\sum\nolimits_{i=1}^{N} sampleCoef_{post}(ch, i) \times sampleCoef_{post}(ch, i)\right)^{1/2},$$

where ch represents a channel index, $E_{post}(ch)$ represents energy/an amplitude of an audio signal of a channel with a channel index ch after stereo processing, $sampleCoef_{post}(ch, i)$ represents an $i^{th}$ coefficient of the current frame of a $(ch)^{th}$ channel after stereo processing, and N represents a quantity of coefficients of the current frame and is a positive integer greater than 1.

In some embodiments, the bit allocation module 702 is configured to determine the energy/amplitude sum of the current frame based on respective energy/amplitudes of the audio signals of the P channels before energy/amplitude equalization.

In some embodiments, the bit allocation module 702 is configured to calculate the energy/amplitude sum $sum\_E_{pre}$ of the current frame according to a formula $$sum\_E_{pre} = \sum_{ch=1}^{P} E_{pre}(ch),$$

where ch represents a channel index, and $E_{pre}(ch)$ represents energy/an amplitude of an audio signal of a channel with a channel index ch before energy/amplitude equalization.

In some embodiments, the bit allocation module 702 is configured to determine the energy/amplitude sum of the current frame based on respective energy/amplitudes of the audio signals of the P channels before energy/amplitude equalization and respective weighting coefficients of the P channels, where the weighting coefficient is less than or equal to 1.

In some embodiments, the bit allocation module 702 is configured to:

calculate the energy/amplitude sum $sum\_E_{pre}$ of the current frame according to a formula $$sum\_E_{pre} = \sum_{ch=1}^{P} \alpha(ch) * E_{pre}(ch),$$

where $\alpha(ch)$ represents a weighting coefficient of the $(ch)^{th}$ channel, weighting coefficients of two channels in one channel pair are the same, and values of the weighting coefficients of the two channels in the one channel pair are inversely proportional to a normalized correlation value between the two channels.

In some embodiments, the audio signals of the P channels further include audio signals of Q uncoupled channels, where P=2×K+Q, K is a positive integer, and Q is a positive integer. The bit allocation module 702 is configured to determine the respective bit quantities of the K channel pairs and respective bit quantities of the Q channels based on the respective energy/amplitudes of the audio signals of the P channels and the quantity of available bits. The encoding module 703 is configured to: encode the audio signals of the K channel pairs based on the respective bit quantities of the K channel pairs, and encode the audio signals of the Q channels based on the respective bit quantities of the Q channels.

In some embodiments, the bit allocation module 702 is configured to determine the energy/amplitude sum of the current frame based on the respective energy/amplitudes of the audio signals of the P channels; determine the respective bit coefficients of the K channel pairs based on the respective energy/amplitudes of the audio signals of the K channel pairs and the energy/amplitude sum of the current frame; determine respective bit coefficients of the Q channels based on respective energy/amplitudes of the audio signals of the Q channels and the energy/amplitude sum of the current frame; determine the respective bit quantities of the K channel pairs based on the respective bit coefficients of the K channel pairs and the quantity of available bits; and determine the respective bit quantities of the Q channels based on the respective bit coefficients of the Q channels and the quantity of available bits.

In some embodiments, the apparatus may further include an energy/amplitude equalization module 704. The energy/amplitude equalization module 704 is configured to obtain, based on the audio signals of the P channels, audio signals of the P channels after energy/amplitude equalization. The energy/amplitude of the audio signal of the one channel after energy/amplitude equalization is obtained by using the audio signal of the one channel after energy/amplitude equalization.

The encoding module 703 is configured to encode, based on the respective bit quantities of the K channel pairs, the audio signals of the P channels after energy/amplitude equalization.

It should be noted that the obtaining module 701, the bit allocation module 702, and the encoding module 703 may be used in an audio signal encoding process of an encoder side.

It should be further noted that for example embodiment processes of the obtaining module 701, the bit allocation module 702, and the encoding module 703, refer to detailed descriptions in the foregoing method embodiments. For brevity of the specification, details are not described herein again.

An embodiment of this application further provides another audio signal encoding apparatus. The audio signal encoding apparatus may use a schematic structural diagram shown in FIG. 9. The audio signal encoding apparatus in this embodiment is configured to perform the method in the embodiment shown in FIG. 8.

In some embodiments, different from functions of the modules in the embodiment shown in FIG. 9, in this embodiment, the obtaining module 701 is configured to obtain audio signals of P channels in a current frame of a multi-channel audio signal, where P is a positive integer greater than 1, the audio signals of the P channels include audio signals of K channel pairs, and K is a positive integer.

The energy/amplitude equalization module 704 is configured to perform energy/amplitude equalization on audio signals of two channels in a current channel pair in the K channel pairs based on respective energy/amplitudes of the audio signals of the two channels in the current channel pair, to obtain respective energy/amplitudes of the audio signals of the two channels in the current channel pair after energy/amplitude equalization.

The bit allocation module 702 is configured to determine respective bit quantities of the two channels in the current channel pair based on the respective energy/amplitudes of the audio signals of the two channels in the current channel pair after energy/amplitude equalization and a quantity of available bits.

The encoding module 703 is configured to encode the audio signals of the two channels based on the respective bit quantities of the two channels in the current channel pair, to obtain an encoded bitstream.

In some embodiments, the bit allocation module 702 is configured to determine an energy/amplitude sum of the current frame based on respective energy/amplitudes of the audio signals of the P channels after energy/amplitude equalization; and determine the respective bit quantities of the two channels in the current channel pair based on the energy/amplitude sum of the current frame, the respective energy/amplitudes of the audio signals of the two channels in the current channel pair after energy/amplitude equalization, and the quantity of available bits.

In some embodiments, the audio signals of the P channels further include audio signals of Q uncoupled channels, where P=2×K+Q, K is a positive integer, and Q is a positive integer.

The bit allocation module 702 is configured to: determine the energy/amplitude sum of the current frame based on energy/amplitudes of audio signals of two channels in each of the K channel pairs after energy/amplitude equalization and energy/amplitudes of the audio signals of the Q channels after energy/amplitude equalization; determine the respective bit quantities of the two channels in the current channel pair based on the energy/amplitude sum of the current frame, the respective energy/amplitudes of the audio signals of the two channels in the current channel pair, and the quantity of available bits; and determine respective bit quantities of the Q channels based on the energy/amplitude sum of the current frame, the respective energy/amplitudes of the audio signals of the Q channels after energy/amplitude equalization, and the quantity of available bits.

The encoding module 703 is configured to: encode the audio signals of the K channel pairs based on the respective bit quantities of the K channel pairs, and encode the audio signals of the Q channels based on the respective bit quantities of the Q channels, to obtain the encoded bitstream.

It should be noted that the obtaining module 701, the bit allocation module 702, the energy/amplitude equalization module 704, and the encoding module 703 may be used in an audio signal encoding process of an encoder side.

It should be further noted that for example embodiment processes of the obtaining module 701, the bit allocation module 702, the energy/amplitude equalization module 704, and the encoding module 703, refer to detailed description of the method embodiment shown in FIG. 8. For brevity of the specification, details are not described herein again.

Based on a same inventive concept as the foregoing method, an embodiment of this application provides an audio signal encoder. The audio signal encoder is configured to encode an audio signal, and includes, for example, the encoder described in the foregoing one or more embodiments. The audio signal encoding apparatus is configured to perform encoding to generate a corresponding bitstream.

Figure 10:
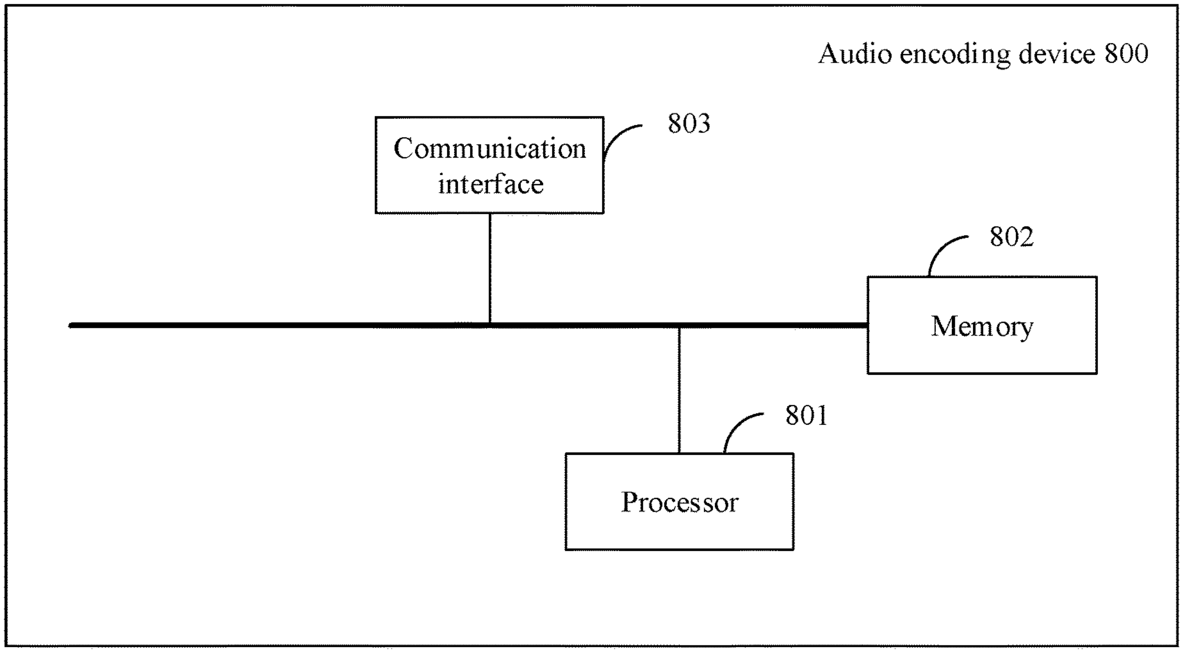
FIG. 10 is a schematic structural diagram of an audio signal encoding device according to an embodiment of this application.

Based on a same inventive concept as the foregoing method, an embodiment of this application provides a device for encoding an audio signal, for example, an audio signal encoding device. As shown in FIG. 10, the audio signal encoding device 800 includes:

a processor 801, a memory 802, and a communication interface 803 (there may be one or more processors 801 in the audio signal encoding device 800, and one processor is used as an example in FIG. 10). In some embodiments of this application, the processor 801, the memory 802, and the communication interface 803 may be connected through a bus or in another manner. FIG. 10 shows an example in which the processor 801, the memory 802, and the communication interface 803 are connected through a bus.

The memory 802 may include a read-only memory and a random access memory, and provide instructions and data to the processor 801. A part of the memory 802 may further include a non-volatile random access memory (NVRAM). The memory 802 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 801 controls operations of the audio encoding device, and the processor 801 may also be referred to as a central processing unit (CPU). In an example embodiment, components of the audio encoding device are coupled together by using a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 801, or may be implemented by the processor 801. The processor 801 may be an integrated circuit chip and has a signal processing capability. In an example process, steps in the foregoing methods can be implemented by a hardware integrated logical circuit in the processor 801 or by using instructions in a form of software. The processor 801 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 801 may implement or perform the methods, the steps, and logical block diagrams that are disclosed in the embodiments of this application. The general-purpose processor may be a microprocessor, or may be any conventional processor or the like. Steps of the methods disclosed with reference to the embodiments of this application may be directly performed and completed by a hardware decoding processor, or may be performed and completed by using a combination of hardware and software modules in the decoding processor. A software module may be located in a storage medium mature in the art, such as a random access memory, a flash memory, a read-only memory, a programmable read-only memory, an electrically erasable programmable memory, a register, or the like. The storage medium is located in the memory 802, and the processor 801 reads information in the memory 802 and completes the steps in the foregoing method in combination with hardware of the processor 801.

The communication interface 803 may be configured to receive or send digital or character information, and may be, for example, an input/output interface, a pin, or a circuit. For example, the foregoing encoded bitstream is sent through the communication interface 803.

Based on a same inventive concept as the foregoing method, an embodiment of this application provides an audio encoding device, including a non-volatile memory and a processor that are coupled to each other. The processor invokes the program code stored in the memory to perform some or all of the steps of the multi-channel audio signal encoding method described in the foregoing one or more embodiments.

Based on a same inventive concept as the foregoing method, an embodiment of this application provides a computer-readable storage medium. The computer-readable storage medium stores program code, and the program code includes instructions used to perform some or all of the steps of the multi-channel audio signal encoding method in the foregoing one or more embodiments.

Based on a same inventive concept as the foregoing method, an embodiment of this application provides a computer program product. When the computer program product is run on a computer, the computer is enabled to perform some or all of the steps of the multi-channel audio signal encoding method in the foregoing one or more embodiments.

The processor mentioned in the foregoing embodiments may be an integrated circuit chip, and has a signal processing capability. In an example process, the steps in the foregoing method embodiments can be implemented by a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or may be any conventional processor or the like. Steps of the methods disclosed in the embodiments of this application may be directly performed and completed by a hardware encoding processor, or may be performed and completed by a combination of hardware and software modules in an encoding processor. A software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory in the system and the method described in this specification is intended to include, but not limited to, these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, or unit, refer to a corresponding process in the foregoing method embodiments. Details are not described herein again.

In the several embodiments provided in this application, it should be understood that, the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, the functional units in the embodiments of this application may be integrated into one processing unit, or each of the units may exist alone physically, or two or more of the units are integrated into one unit.

When the functions are implemented in a form of a software functional unit and sold or used as an independent product, the functions may be stored in a computer-readable storage medium. Based on such an understanding, the technical solutions of this application essentially, or a part contributing to the prior art, or some of the technical solutions may be implemented in a form of a software product. The software product is stored in a storage medium and includes several instructions for instructing a computer device (which is a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-channel audio signal encoding method, comprising:

obtaining audio signals of P channels in a current frame of a multi-channel audio signal, wherein P is a positive integer greater than 1, the audio signals of the P channels comprise audio signals of K channel pairs, and K is a positive integer;

obtaining respective amplitudes of the audio signals of the P channels;

performing amplitude equalization on audio signals of two channels in a current channel pair in the K channel pairs based on respective amplitudes of the audio signals of the two channels in the current channel pair, to obtain respective amplitudes of the audio signals of the two channels in the current channel pair after the amplitude equalization, wherein the amplitudes of the audio signals of the two channels in the current channel pair after amplitude equalization is an average value of amplitude of the audio signals of the two channels in the current channel pair before amplitude equalization;

determining respective bit quantities of the K channel pairs based on the respective amplitudes of the audio signals of the P channels and a quantity of available bits, wherein a bit quantity of a channel pair is determined based on the amplitude of the audio signals of the channel pairs, wherein a quantity of bits allocated to any single channel does not exceed a threshold calculated based on a saturated encoding bit rate of the single channel; and encoding the audio signals of the P channels based on the respective bit quantities of the K channel pairs to obtain an encoded bitstream, wherein an amplitude of an audio signal of one of the P channels comprises at least one of: an amplitude of the audio signal of the one of the P channels in a time domain, an amplitude of the audio signal of the one of the P channels after a time-frequency transform, an amplitude of the audio signal of the one of the P channels after a time-frequency transform and whitening, an amplitude of the audio signal of the one of the P channels after amplitude equalization, or an amplitude of the audio signal of the one of the P channels after stereo processing.

2. The method according to claim 1, wherein the K channel pairs comprise the current channel pair, wherein the encoding the audio signals of the P channels based on the respective bit quantities of the K channel pairs comprises encoding audio signals of the current channel pair based on a bit quantity of the current channel pair, and wherein the encoding the audio signals of the current channel pair based on the bit quantity of the current channel pair comprises:

determining respective bit quantities of two channels in the current channel pair based on the bit quantity of the current channel pair and respective amplitudes of audio signals of the two channels in the current channel pair after stereo processing; and encoding the audio signals of the two channels based on the respective bit quantities of the two channels in the current channel pair.

3. The method according to claim 1, wherein the determining the respective bit quantities of the K channel pairs based on the respective amplitudes of the audio signals of the P channels and the quantity of available bits comprises:

determining an amplitude sum of the current frame based on the respective amplitudes of the audio signals of the P channels;

determining respective bit coefficients of the K channel pairs based on the respective amplitudes of the audio signals of the K channel pairs and the amplitude sum of the current frame; and determining the respective bit quantities of the K channel pairs based on the respective bit coefficients of the K channel pairs and the quantity of available bits.

4. The method according to claim 3, wherein the determining the amplitude sum of the current frame based on the respective amplitudes of the audio signals of the P channels comprises:

determining the amplitude sum of the current frame based on respective amplitudes of the audio signals of the P channels after stereo processing.

5. The method according to claim 4, wherein the determining the amplitude sum of the current frame based on the amplitudes of the audio signals of the P channels after stereo processing comprises:

calculating the amplitude sum $sum\_E_{post}$ of the current frame according to a $$sum\_E_{post} = \sum_{ch=1}^{P} E_{post}(ch),$$

wherein $$E_{post}(ch) = \left(\sum_{i=1}^{N} sampleCoef_{post}(ch,\ i) \times sampleCoef_{post}(ch,\ i)\right)^{1/2},$$

ch represents a channel index, $E_{post}(ch)$ represents an amplitude of an audio signal of a channel with a channel index ch after stereo processing, $sampleCoef_{post}(ch, i)$ represents an $i^{th}$ coefficient of the current frame of a $(ch)^{th}$ channel after stereo processing, and N represents a quantity of coefficients of the current frame and is a positive integer greater than 1.

6. The method according to claim 3, wherein the determining the amplitude sum of the current frame based on the respective amplitudes of the audio signals of the P channels comprises:

determining the amplitude sum of the current frame based on respective amplitudes of the audio signals of the P channels before amplitude equalization, wherein the amplitude of the audio signal of the one of the P channels before amplitude equalization comprises an amplitude of the audio signal of the one of the P channels in the time domain, an amplitude of the audio signal of the one of the P channels after the time-frequency transform, or the amplitude of the audio signal of the one of the P channels after the time-frequency transform and whitening.

7. The method according to claim 6, wherein the determining the amplitude sum of the current frame based on the respective amplitudes of the audio signals of the P channels before amplitude equalization comprises:

calculating the amplitude sum $sum\_E_{pre}$ of the current frame according to a formula $$sum\_E_{pre} = \sum_{ch=1}^{P} E_{pre}(ch),$$

wherein ch represents a channel index, and $E_{pre}(ch)$ represents an amplitude of an audio signal of a channel with a channel index ch before amplitude equalization.

8. The method according to claim 3, wherein the determining the amplitude sum of the current frame based on the respective amplitudes of the audio signals of the P channels comprises:

determining the amplitude sum of the current frame based on the respective amplitudes of the audio signals of the P channels before amplitude equalization and respective weighting coefficients of the P channels, wherein the respective weighting coefficients are less than or equal to 1.

9. The method according to claim 8, wherein the determining the amplitude sum of the current frame based on the respective amplitudes of the audio signals of the P channels before amplitude equalization and respective weighting coefficients of the P channels comprises:

calculating the amplitude sum $sum\_E_{pre}$ of the current frame according to a formula $$sum\_E_{pre} = \sum_{ch=1}^{P} \alpha(ch) * E_{pre}(ch),$$

wherein ch represents a channel index, $E_{pre}(ch)$ represents an amplitude of an audio signal of a $(ch)^{th}$ channel before energy/amplitude equalization, α(ch) represents a weighting coefficient of the $(ch)^{th}$ channel, the weighting coefficients of two channels in one channel pair are the same, and values of the weighting coefficients of the two channels in the one channel pair are inversely proportional to a normalized correlation value between the two channels in the one channel pair.

10. The method according to claim 1, wherein the audio signals of the P channels further comprise audio signals of Q uncoupled channels, wherein P=2×K+Q, and Q is a positive integer;

the determining the respective bit quantities of the K channel pairs based on the respective amplitudes of the audio signals of the P channels and the quantity of available bits comprises:

determining the respective bit quantities of the K channel pairs and respective bit quantities of the Q channels based on the respective amplitudes of the audio signals of the P channels and the quantity of available bits; and the encoding the audio signals of the P channels based on the respective bit quantities of the K channel pairs comprises:

encoding the audio signals of the K channel pairs based on the respective bit quantities of the K channel pairs, and encoding the audio signals of the Q channels based on the respective bit quantities of the Q channels.

11. The method according to claim 10, wherein the determining the respective bit quantities of the K channel pairs and the respective bit quantities of the Q channels based on the respective amplitudes of the audio signals of the P channels and the quantity of available bits comprises:

determining an amplitude sum of the current frame based on the respective amplitudes of the audio signals of the P channels;

determining respective bit coefficients of the K channel pairs based on the respective amplitudes of the audio signals of the K channel pairs and the amplitude sum of the current frame;

determining respective bit coefficients of the Q channels based on respective amplitudes of the audio signals of the Q channels and the amplitude sum of the current frame;

determining the respective bit quantities of the K channel pairs based on the respective bit coefficients of the K channel pairs and the quantity of available bits; and determining the respective bit quantities of the Q channels based on the respective bit coefficients of the Q channels and the quantity of available bits.

12. The method according to claim 1, wherein the encoding the audio signals of the P channels based on the respective bit quantities of the K channel pairs comprises:

encoding, based on the respective bit quantities of the K channel pairs, the audio signals of the P channels after amplitude equalization.

13. A multi-channel audio signal encoding method, comprising:

obtaining audio signals of P channels in a current frame of a multi-channel audio signal, wherein P is a positive integer greater than 1, the audio signals of the P channels comprise audio signals of K channel pairs, and K is a positive integer;

performing amplitude equalization on audio signals of two channels in a current channel pair in the K channel pairs based on respective amplitudes of the audio signals of the two channels in the current channel pair, to obtain respective amplitudes of the audio signals of the two channels in the current channel pair after the amplitude equalization, wherein the amplitudes of the audio signals of the two channels in the current channel pair after amplitude equalization is an average value of amplitude of the audio signals of the two channels in the current channel pair before amplitude equalization;

determining respective bit quantities of the two channels in the current channel pair based on the respective amplitudes of the audio signals of the two channels in the current channel pair after the amplitude equalization and a quantity of available bits, wherein a bit quantity of a channel pair is determined based on the amplitude of the audio signals of the channel pairs, wherein a quantity of bits allocated to any single channel does not exceed a threshold calculated based on a saturated encoding bit rate of the single channel; and encoding the audio signals of the two channels based on the respective bit quantities of the two channels in the current channel pair, to obtain an encoded bitstream.

14. The method according to claim 13, wherein P=2×K, and the determining the respective bit quantities of the two channels in the current channel pair based on the respective amplitudes of the audio signals of the two channels in the current channel pair after the amplitude equalization and the quantity of available bits comprises:

determining an amplitude sum of the current frame based on respective amplitudes of the audio signals of the P channels after the amplitude equalization; and determining the respective bit quantities of the two channels in the current channel pair based on the amplitude sum of the current frame, the respective amplitudes of the audio signals of the two channels in the current channel pair after the amplitude equalization, and the quantity of available bits.

15. The method according to claim 13, wherein the audio signals of the P channels further comprise audio signals of Q uncoupled channels, wherein P=2×K+Q, and Q is a positive integer;

the determining the respective bit quantities of the two channels in the current channel pair based on the respective amplitudes of the audio signals of the two channels in the current channel pair after the amplitude equalization and the quantity of available bits comprises:

determining an amplitude sum of the current frame based on amplitudes of audio signals of two channels in each of the K channel pairs after the amplitude equalization and amplitudes of the audio signals of the Q channels after the amplitude equalization;

determining the respective bit quantities of the two channels in the current channel pair based on the amplitude sum of the current frame, the respective amplitudes of the audio signals of the two channels in the current channel pair, and the quantity of available bits; and determining respective bit quantities of the Q channels based on the amplitude sum of the current frame, the respective amplitudes of the audio signals of the Q channels after amplitude equalization, and the quantity of available bits; and the encoding the audio signals of the two channels based on the respective bit quantities of the two channels in the current channel pair, to obtain the encoded bitstream comprises:

encoding the audio signals of the K channel pairs based on the respective bit quantities of the K channel pairs, and encoding the audio signals of the Q channels based on the respective bit quantities of the Q channels, to obtain the encoded bitstream.

16. A non-transitory computer-readable storage medium, comprising an encoded bitstream obtained by performing operations comprising:

obtaining audio signals of P channels in a current frame of a multi-channel audio signal, wherein P is a positive integer greater than 1, the audio signals of the P channels comprise audio signals of K channel pairs, and K is a positive integer;

obtaining respective amplitudes of the audio signals of the P channels;

performing amplitude equalization on audio signals of two channels in a current channel pair in the K channel pairs based on respective amplitudes of the audio signals of the two channels in the current channel pair, to obtain respective amplitudes of the audio signals of the two channels in the current channel pair after the amplitude equalization, wherein the amplitudes of the audio signals of the two channels in the current channel pair after amplitude equalization is an average value of amplitude of the audio signals of the two channels in the current channel pair before amplitude equalization;

determining respective bit quantities of the K channel pairs based on the respective amplitudes of the audio signals of the P channels and a quantity of available bits, wherein a bit quantity of a channel pair is determined based on the amplitude of the audio signals of the channel pairs, wherein a quantity of bits allocated to any single channel does not exceed a threshold calculated based on a saturated encoding bit rate of the single channel; and encoding the audio signals of the P channels based on the respective bit quantities of the K channel pairs to obtain an encoded bitstream, wherein an amplitude of an audio signal of one of the P channels comprises at least one of: an amplitude of the audio signal of the one of the P channels in a time domain, an amplitude of the audio signal of the one of the P channels after a time-frequency transform, an amplitude of the audio signal of the one of the P channels after a time-frequency transform and whitening, an amplitude of the audio signal of the one of the P channels after amplitude equalization, or an amplitude of the audio signal of the one of the P channels after stereo processing.

17. The non-transitory computer-readable storage medium according to claim 16, wherein the K channel pairs comprise the current channel pair, wherein the encoding the audio signals of the P channels based on the respective bit quantities of the K channel pairs comprises encoding audio signals of the current channel pair based on a bit quantity of the current channel pair, and wherein the encoding the audio signals of the current channel pair based on the bit quantity of the current channel pair comprises:

determining respective bit quantities of two channels in the current channel pair based on the bit quantity of the current channel pair and respective amplitudes of audio signals of the two channels in the current channel pair after stereo processing; and encoding the audio signals of the two channels based on the respective bit quantities of the two channels in the current channel pair.

18. The non-transitory computer-readable storage medium according to claim 16, wherein the determining the respective bit quantities of the K channel pairs based on the respective amplitudes of the audio signals of the P channels and the quantity of available bits comprises:

determining an amplitude sum of the current frame based on the respective amplitudes of the audio signals of the P channels;

determining respective bit coefficients of the K channel pairs based on the respective amplitudes of the audio signals of the K channel pairs and the amplitude sum of the current frame; and determining the respective bit quantities of the K channel pairs based on the respective bit coefficients of the K channel pairs and the quantity of available bits.

19. A non-transitory computer-readable storage medium, comprising an encoded bitstream obtained by performing operations comprising:

obtaining audio signals of P channels in a current frame of a multi-channel audio signal, wherein P is a positive integer greater than 1, the audio signals of the P channels comprise audio signals of K channel pairs, and K is a positive integer;

performing amplitude equalization on audio signals of two channels in a current channel pair in the K channel pairs based on respective amplitudes of the audio signals of the two channels in the current channel pair, to obtain respective amplitudes of the audio signals of the two channels in the current channel pair after amplitude equalization, wherein the amplitudes of the audio signals of the two channels in the current channel pair after amplitude equalization is an average value of amplitude of the audio signals of the two channels in the current channel pair before amplitude equalization;

determining respective bit quantities of the two channels in the current channel pair based on the respective amplitudes of the audio signals of the two channels in the current channel pair after amplitude equalization and a quantity of available bits, wherein a bit quantity of a channel pair is determined based on the amplitude of the audio signals of the channel pairs, wherein a quantity of bits allocated to any single channel does not exceed a threshold calculated based on a saturated encoding bit rate of the single channel; and encoding the audio signals of the two channels based on the respective bit quantities of the two channels in the current channel pair, to obtain an encoded bitstream.

20. The non-transitory computer-readable storage medium according to claim 19, wherein $P=2\times K$, and the determining the respective bit quantities of the two channels in the current channel pair based on the respective amplitudes of the audio signals of the two channels in the current channel pair after amplitude equalization and the quantity of available bits comprises:

determining an amplitude sum of the current frame based on respective amplitudes of the audio signals of the P channels after amplitude equalization; and determining the respective bit quantities of the two channels in the current channel pair based on the amplitude sum of the current frame, the respective amplitudes of the audio signals of the two channels in the current channel pair after amplitude equalization, and the quantity of available bits.

* * * * *